United States Patent
Master et al.

(10) Patent No.: US 6,836,839 B2
(45) Date of Patent: Dec. 28, 2004

(54) ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS

(75) Inventors: Paul L. Master, Sunnyvale, CA (US); Eugene Hogenauer, San Carlos, CA (US); Walter James Scheuermann, Saratoga, CA (US)

(73) Assignee: Quicksilver Technology, Inc., San Jose, CA (US)

( * ) Notice: Subject to any disclaimer, the term of this patent is extended or adjusted under 35 U.S.C. 154(b) by 495 days.

(21) Appl. No.: 09/815,122

(22) Filed: Mar. 22, 2001

(65) Prior Publication Data

US 2002/0138716 A1 Sep. 26, 2002

(51) Int. Cl.[7] ..................... G06F 15/173; G06F 15/177; G06F 13/40
(52) U.S. Cl. .............................. 712/29; 712/15; 712/17; 712/18; 712/221; 712/225; 710/312; 710/315
(58) Field of Search .............................. 712/15, 17, 18, 712/29, 221, 225, 227, 41, 20, 10, 11, 13, 14, 16, 201; 710/312, 315; 326/41, 38, 39; 708/232; 379/185; 700/113

(56) References Cited

U.S. PATENT DOCUMENTS

| | | | | |
|---|---|---|---|---|
| 5,450,557 A | * | 9/1995 | Kopp et al. ................... 712/24 |
| 5,646,544 A | | 7/1997 | Iadanza ....................... 326/38 |
| 5,737,631 A | | 4/1998 | Trimberger ............ 395/800.37 |
| 5,828,858 A | | 10/1998 | Athanas et al. ............. 395/311 |
| 5,889,816 A | * | 3/1999 | Agrawal et al. ............. 375/220 |
| 5,892,961 A | | 4/1999 | Trimberger .............. 395/800.1 |
| 5,907,580 A | | 5/1999 | Cummings .................. 375/220 |
| 5,910,733 A | * | 6/1999 | Bertolet et al. ............... 326/41 |
| 5,959,881 A | | 9/1999 | Trimberger et al. ........ 365/182 |
| 5,963,048 A | * | 10/1999 | Harrison et al. .............. 326/39 |
| 5,970,254 A | | 10/1999 | Cooke et al. .......... 395/800.37 |
| 5,996,534 A | | 12/1999 | Cooke et al. ............... 395/705 |
| 6,023,742 A | | 2/2000 | Ebeling et al. ............. 710/107 |
| 6,088,043 A | | 7/2000 | Kelleher et al. ............ 345/502 |
| 6,094,065 A | | 7/2000 | Tavana et al. ................ 326/39 |
| 6,120,551 A | | 9/2000 | Law et al. .................... 716/17 |
| 6,150,838 A | | 11/2000 | Wittig et al. .................. 326/39 |
| 6,230,307 B1 | | 5/2001 | Davis et al. .................. 716/16 |
| 6,237,029 B1 | | 5/2001 | Master et al. ............... 709/217 |
| 6,266,760 B1 | * | 7/2001 | DeHon et al. ................ 712/15 |
| 6,282,627 B1 | * | 8/2001 | Wong et al. .................. 712/15 |
| 6,353,841 B1 | * | 3/2002 | Marshall et al. ............ 708/232 |
| 6,408,039 B1 | * | 6/2002 | Ito ............................. 375/347 |
| 6,433,578 B1 | * | 8/2002 | Wasson ....................... 326/38 |

* cited by examiner

*Primary Examiner*—Daniel H. Pan
(74) *Attorney, Agent, or Firm*—Nancy R. Gamburd

(57) ABSTRACT

The present invention concerns a new category of integrated circuitry and a new methodology for adaptive or reconfigurable computing. The preferred IC embodiment includes a plurality of heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations. The various fixed architectures are selected to comparatively minimize power consumption and increase performance of the adaptive computing integrated circuit, particularly suitable for mobile, hand-held or other battery-powered computing applications.

93 Claims, 16 Drawing Sheets

ADAPTIVE COMPUTING ENGINE (ACE)

ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS

FIELD OF THE INVENTION

The present invention relates, in general, to integrated circuits and, more particularly, to adaptive integrated circuitry with heterogeneous and reconfigurable matrices of diverse and adaptive computational units having fixed, application specific computational elements.

BACKGROUND OF THE INVENTION

The advances made in the design and development of integrated circuits ("ICs") have generally produced ICs of several different types or categories having different properties and functions, such as the class of universal Turing machines (including microprocessors and digital signal processors ("DSPs")), application specific integrated circuits ("ASICs" and field programmable gate arrays("FPGAs"). Each of these different types of ICs, and their corresponding design methodologies, have distinct advantages and disadvantages.

Microprocessors and DSPs, for example, typically provide a flexible, software programmable solution for the implementation of a wide variety of tasks. As various technology standards evolve, microprocessors and DSPs may be reprogrammed, to varying degrees, to perform various new or altered functions or operations. Various tasks or algorithms, however, must be partitioned and constrained to fit the physical limitations of the processor, such as bus widths and hardware availability. In addition, as processors are designed for the execution of instructions, large areas of the IC are allocated to instruction processing, with the result that the processors are comparatively inefficient in the performance of actual algorithmic operations, with only a few percent of these operations performed during any given clock cycle. Microprocessors and DSPs, moreover, have a comparatively limited activity factor, such as having only approximately five percent of their transistors engaged in algorithmic operations at any given time, with most of the transistors allocated to instruction processing. As a consequence, for the performance of any given algorithmic operation, processors consume significantly more IC (or silicon) area and consume significantly more power compared to other types of ICs, such as ASICs.

While having comparative advantages in power consumption and size, ASICs provide a fixed, rigid or "hard-wired" implementation of transistors (or logic gates) for the performance of a highly specific task or a group of highly specific tasks. ASICs typically perform these tasks quite effectively, with a comparatively high activity factor, such as with twenty-five to thirty percent of the transistors engaged in switching at any given time. Once etched, however, an ASIC is not readily changeable, with any modification being time-consuming and expensive, effectively requiring new masks and new fabrication. As a further result, ASIC design virtually always has a degree of obsolescence, with a design cycle lagging behind the evolving standards for product implementations. For example, an ASIC designed to implement GSM or CDMA standards for mobile communication becomes relatively obsolete with the advent of a new standard, such as 3G.

FPGAs have evolved to provide some design and programming flexibility, allowing a degree of post-fabrication modification. FPGAs typically consist of small, identical sections or "islands" of programmable logic (logic gates) surrounded by many levels of programmable interconnect, and may include memory elements. FPGAs are homogeneous, with the IC comprised of repeating arrays of identical groups of logic gates, memory and programmable interconnect. A particular function may be implemented by configuring (or reconfiguring) the interconnect to connect the various logic gates in particular sequences and arrangements. The most significant advantage of FPGAs are their post-fabrication reconfigurability, allowing a degree of flexibility in the implementation of changing or evolving specifications or standards. The reconfiguring process for an FPGA is comparatively slow, however, and is typically unsuitable for most real-time, immediate applications.

While this post-fabrication flexibility of FPGAs provides a significant advantage, FPGAs have corresponding and inherent disadvantages. Compared to ASICs, FPGAs are very expensive and very inefficient for implementation of particular functions, and are often subject to a "combinatorial explosion" problem. More particularly, for FPGA implementation, an algorithmic operation comparatively may require orders of magnitude more IC area, time and power, particularly when the particular algorithmic operation is a poor fit to the pre-existing, homogeneous islands of logic gates of the FPGA material. In addition, the programmable interconnect, which should be sufficiently rich and available to provide reconfiguration flexibility, has a correspondingly high capacitance, resulting in comparatively slow operation and high power consumption. For example, compared to an ASIC, an FPGA implementation of a relatively simple function, such as a multiplier, consumes significant IC area and vast amounts of power, while providing significantly poorer performance by several orders of magnitude. In addition, there is a chaotic element to FPGA routing, rendering FPGAs subject to unpredictable routing delays and wasted logic resources, typically with approximately one-half or more of the theoretically available gates remaining unusable due to limitations in routing resources and routing algorithms.

Various prior art attempts to meld or combine these various processor, ASIC and FPGA architectures have had utility for certain limited applications, but have not proven to be successful or useful for low power, high efficiency, and real-time applications. Typically, these prior art attempts have simply provided, on a single chip, an area of known FPGA material (consisting of a repeating array of identical logic gates with interconnect) adjacent to either a processor or an ASIC, with limited interoperability, as an aid to either processor or ASIC functionality. For example, Trimberger U.S. Pat. No. 5,737,631, entitled "Reprogrammable Instruction Set Accelerator", issued Apr. 7, 1998, is designed to provide instruction acceleration for a general purpose processor, and merely discloses a host CPU made up of such a basic microprocessor combined in parallel with known FPGA material (with an FPGA configuration store, which together form the reprogrammable instruction set accelerator). This reprogrammable instruction set accelerator, while allowing for some post-fabrication reconfiguration flexibility and processor acceleration, is nonetheless subject to the various disadvantages of traditional processors and traditional FPGA material, such as high power consumption and high capacitance, with comparatively low speed, low efficiency and low activity factors.

Tavana et al. U.S. Pat. No. 6,094,065, entitled "Integrated Circuit with Field Programmable and Application Specific Logic Areas", issued Jul. 25, 2000, is designed to allow a degree of post-fabrication modification of an ASIC, such as for correction of design or other layout flaws, and discloses use of a field programmable gate array in a parallel combination with a mask-defined application specific logic area (i.e., ASIC material). Once again, known FPGA material, consisting of a repeating array of identical logic gates within a rich programmable interconnect, is merely placed adjacent to ASIC material within the same silicon chip. While potentially providing post-fabrication means for "bug fixes" and other error correction, the prior art IC is nonetheless subject to the various disadvantages of traditional ASICs and traditional FPGA material, such as highly limited reprogrammability of an ASIC, combined with high power consumption, comparatively low speed, low efficiency and low activity factors of FPGAs.

SUMMARY OF THE INVENTION

The present invention provides new form or type of integrated circuitry which effectively and efficiently combines and maximizes the various advantages of processors, ASICs and FPGAs, while minimizing potential disadvantages. In accordance with the present invention, such a new form or type of integrated circuit, referred to as an adaptive computing engine (ACE), is disclosed which provides the programming flexibility of a processor, the post-fabrication flexibility of FPGAs, and the high speed and high utilization factors of an ASIC. The ACE integrated circuitry of the present invention is readily reconfigurable, in real-time, is capable of having corresponding, multiple modes of operation, and further minimizes power consumption while increasing performance, with particular suitability for low power applications, such as for use in hand-held and other battery-powered devices.

The ACE architecture of the present invention, for adaptive or reconfigurable computing, includes a plurality of heterogeneous computational elements coupled to an interconnection network, rather than the homogeneous units of FPGAs. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations.

As illustrated and discussed in greater detail below, the ACE architecture of the present invention provides a single IC, which may be configured and reconfigured in real-time, using these fixed and application specific computation elements, to perform a wide variety of tasks. For example, utilizing differing configurations over time of the same set of heterogeneous computational elements, the ACE architecture may implement functions such as finite impulse response filtering, fast Fourier transformation, discrete cosine transformation, and with other types of computational elements, may implement many other high level processing functions for advanced communications and computing.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
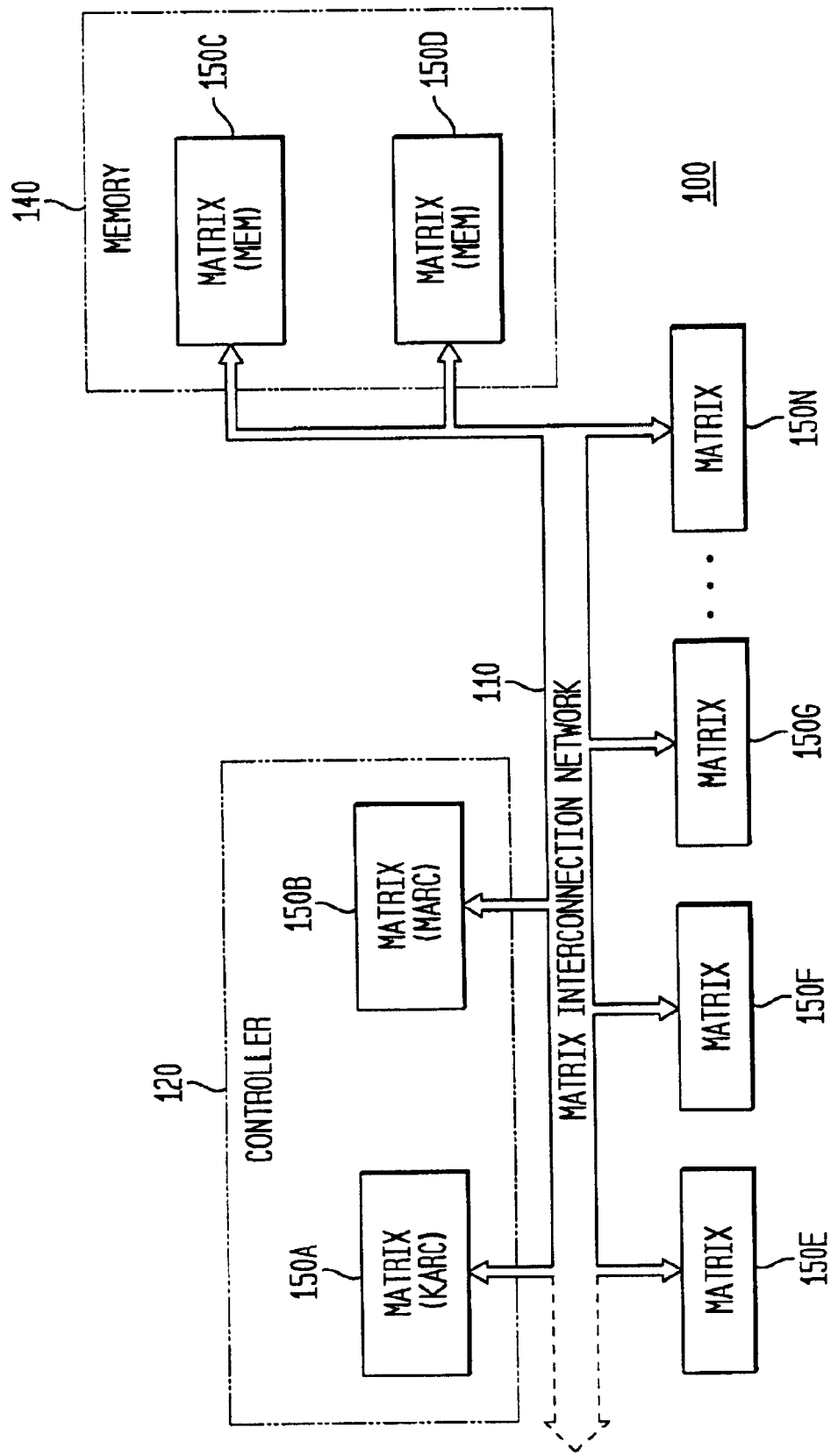
FIG. 1 is a block diagram illustrating a preferred apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for a new form or type of integrated circuitry which effectively and efficiently combines and maximizes the various advantages of processors, ASICs and FPGAs, while minimizing potential disadvantages. In accordance with the present invention, such a new form or type of integrated circuit, referred to as an adaptive computing engine (ACE), is disclosed which provides the programming flexibility of a processor, the post-fabrication flexibility of FPGAs, and the high speed and high utilization factors of an ASIC. The ACE integrated circuitry of the present invention is readily reconfigurable, in real-time, is capable of having corresponding, multiple modes of operation, and further minimizes power consumption while increasing performance, with particular suitability for low power applications.

FIG. 1 is a block diagram illustrating a preferred apparatus 100 embodiment in accordance with the present invention. The apparatus 100, referred to herein as an adaptive computing engine ("ACE") 100, is preferably embodied as an integrated circuit, or as a portion of an integrated circuit having other, additional components. In the preferred embodiment, and as discussed in greater detail below, the ACE 100 includes one or more reconfigurable matrices (or nodes)150, such as matrices 150A through 150N as illustrated, and a matrix interconnection network 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, direct memory access (DMA, random access, configuration and instruction busses for signaling an other transmission between and among the reconfigurable matrices 150, the controller 120, and the memory 140, or for other input/output ("I/O") functionality. Rather, data, control and configuration information a transmitted between and among these matrix 150 elements, utilizing e matrix interconnection network 110, which may be configured reconfigured, in real-time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the preferred embodiment, the memory 140 is included within t e ACE 100, and preferably is comprised of computational elements which a low power consumption random access memory (RAM), but also may be comprised of computational elements of any other form of memory, such as flash, DRAM, SRAM, MRAM, ROM, EPROM or E2PROM. In the preferred embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernal" control, is illustrated as kernal controller ("KARC") of matrix 150A, and the second control functionality, referred to as "matrix" control, is illustrated as matrix controller ("MARC") of matrix 150B. The kernal and matrix control functions of the controller 120 are explained in greater detail below, with reference to the configurability and reconfigurability of the various matrices 150, and with reference to the preferred form of combined data, configuration and control information referred to herein as a "silverware" module.

Figure 3:
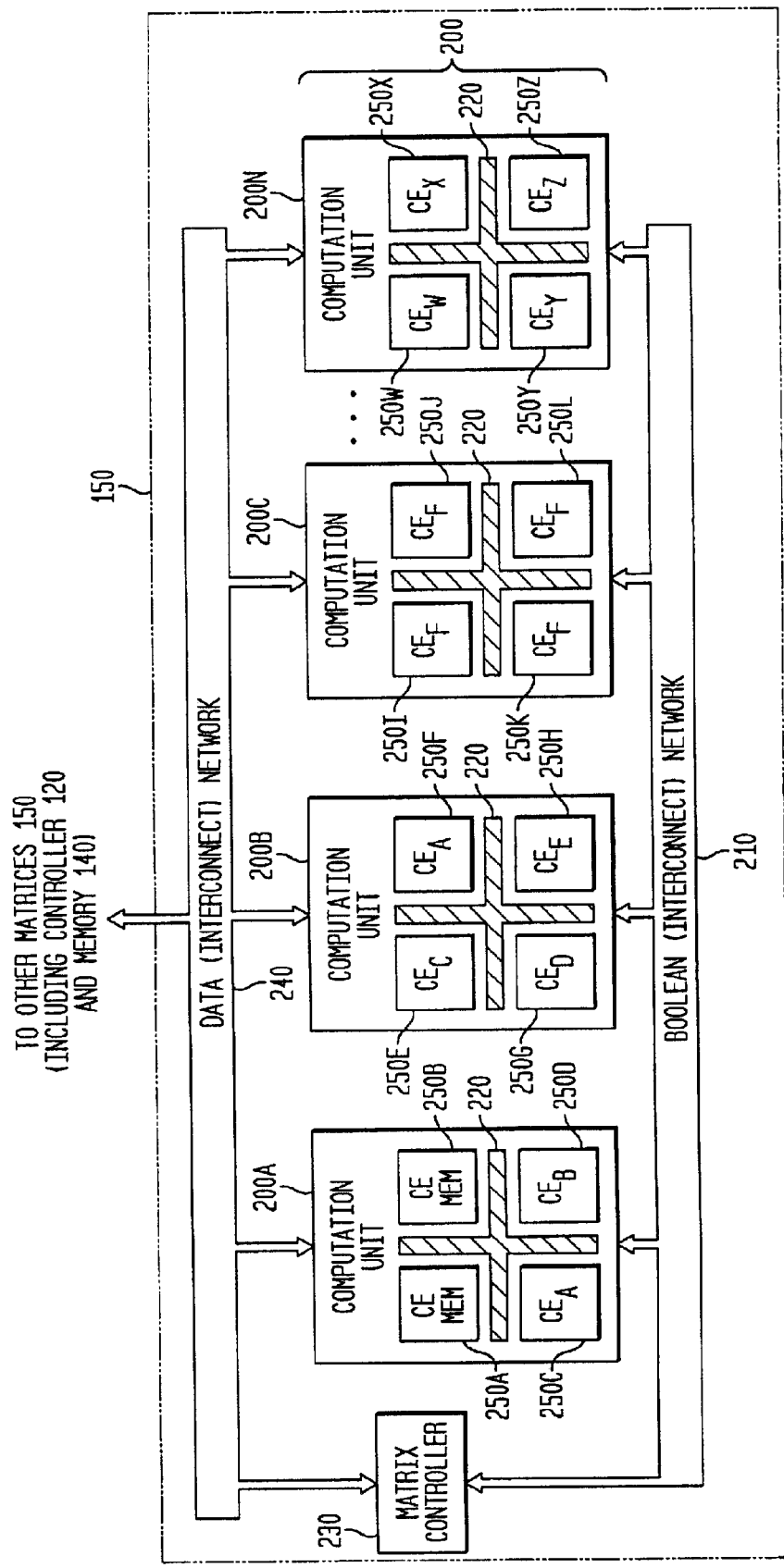
FIG. 3 is a block diagram illustrating a reconfigurable matrix, a plurality of computation units, and a plurality of computational elements, in accordance with the present invention.
Figure 4:
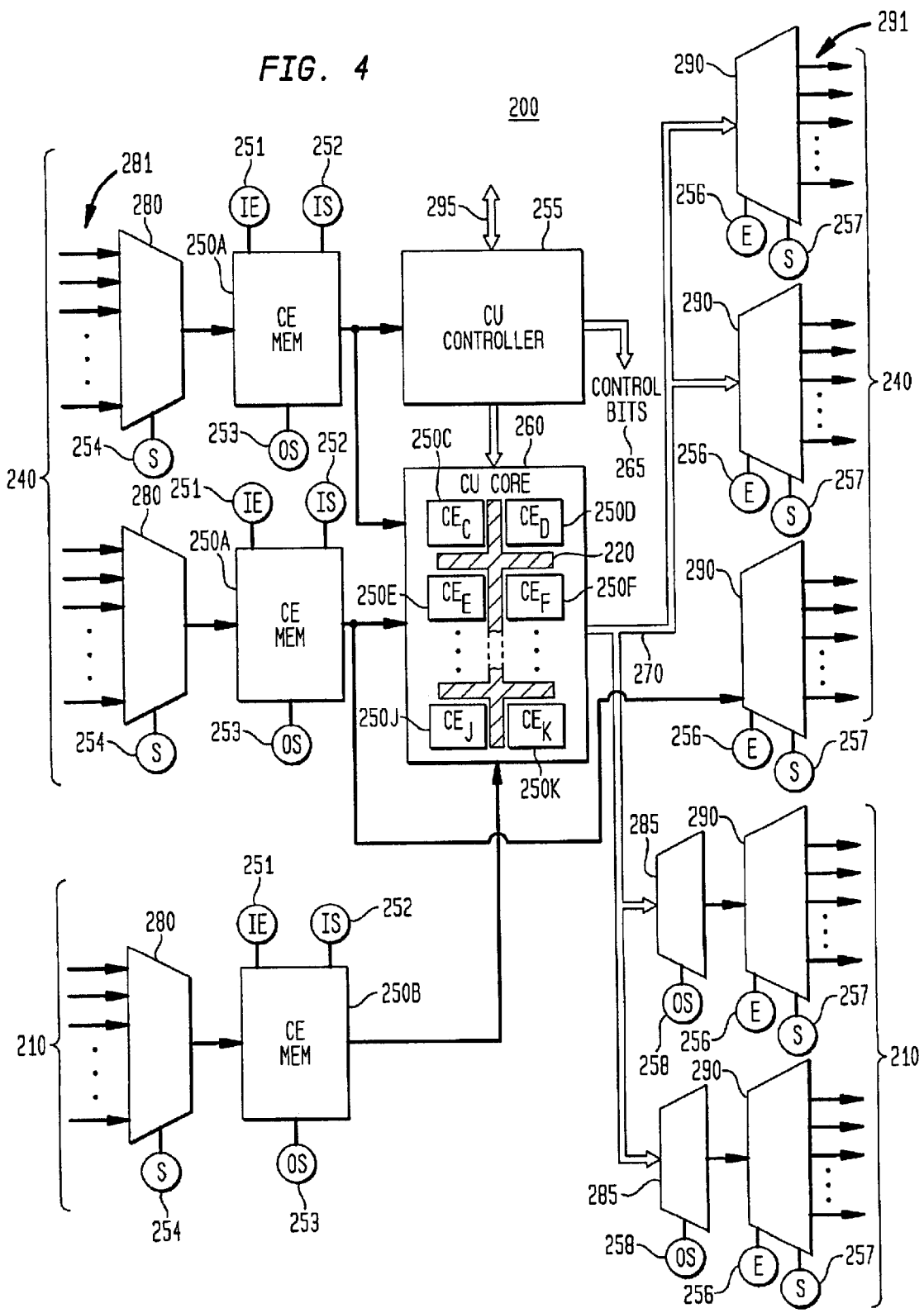
FIG. 4 is a block diagram illustrating, in greater detail, a computational unit of a reconfigurable matrix in accordance with the present invention.

The matrix interconnection network 110 of FIG. 1, and its subset interconnection networks separately illustrated in FIGS. 3 and 4 (Boolean interconnection network 210, data interconnection network 240, and interconnect 220), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the preferred embodiment, the various interconnection networks are implemented as described, for example, in U.S. Pat. Nos. 5,218,240, 5,336,950, 5,245,227, and 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 15ON; reconfigurable matrix 150B is generally different from reconfigurable matrices 150A and 150C through 15ON; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the preferred embodiment, for low power consumption, the functions for acceleration are selected based upon power consumption. For example, for a given application such as mobile communication, corresponding C (C+ or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
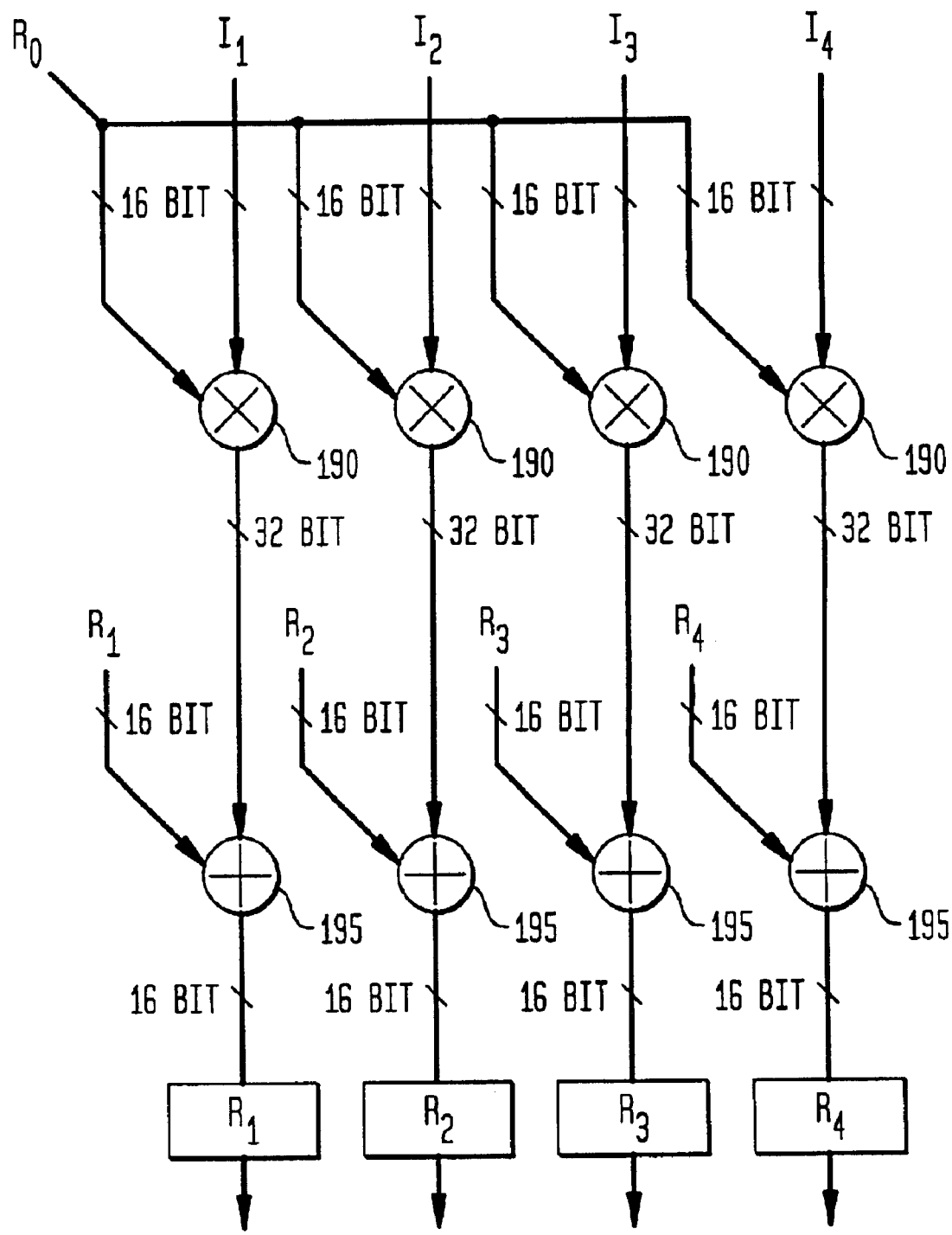
FIG. 2 is a schematic diagram illustrating an exemplary data flow graph in accordance with the present invention.

Next, algorithms or other functions selected for acceleration are converted into a form referred to as a "data flow graph" ("DFG"). A schematic diagram of an exemplary data flow graph, in accordance with the present invention, is illustrated in FIG. 2. As illustrated in FIG. 2, an algorithm or function useful for CDMA voice coding (QCELP (Qualcomm code excited linear prediction) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm. Continuing with the exemplary DFG or FIG. 2, four fixed or dedicated multipliers, as computational elements 250, and four fixed or dedicated adders, also as different computational elements 250, are configured in real-time through the interconnect to perform the functions or algorithms of the particular DFG.

The third and perhaps most significant concept of the present invention, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in real-time, to perform the selected algorithm, such as the performance of discrete cosine transformations often utilized in mobile communications. For the data flow graph example of FIG. 2, four multipliers and four adders will be configured, i.e., connected in real-time, to perform the particular algorithm. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as a "silverware" module, is the subject of a separate, related patent application. For purpose of the present invention, however, it is sufficient to note that this coupling of data and configuration information into one information (or bit) stream helps to enable real-time reconfigurability of the ACE 100, without a nee for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 preferably matrix (KARC) 150A and matrix (MARC) 150B, configured as finite state machines) may be explained (1) with reference to a silverware module, namely, the tight coupling of data and configuration information within a single stream of information, (2) with reference to multiple potential modes of operation, (3) with reference to the reconfigurable matrices 150, and (4) with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 10 resources, the controller 120, through the matrix (KARC) 150A, checks an verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150 does not allow the new module to be incorporated within the ACE 100.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the preferred embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 3 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of the present invention. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIG. 5A through 9). In addition to computational elements 250 which are designed to execute a particular algorithm or function, such as multiplication or addition, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 15SOB), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the preferred embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 4 is a block diagram illustrating, in greater detail, an exemplary or representative computation unit 200 of a reconfigurable matrix 150 in accordance with the present invention. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240, and other elements (above) does with every clock cycle. Not separately illustrated, through the interconnect (210, 220 and 240), the various control its 265 are distributed, as may be needed, to the various portions of the computation unit 200, such as the various input enables 251, input selects 252, output selects 253, MUX selects 254, DEMUX enables 256, DEMUX selects 7, and DEMUX output selects 258. The CU controller 255 also include one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units, in accordance with the present invention. As will be apparent from review of these Figures, many of the same fixed computational elements are utilized, with varying configurations, for the performance of different algorithms.

Figure 5A:
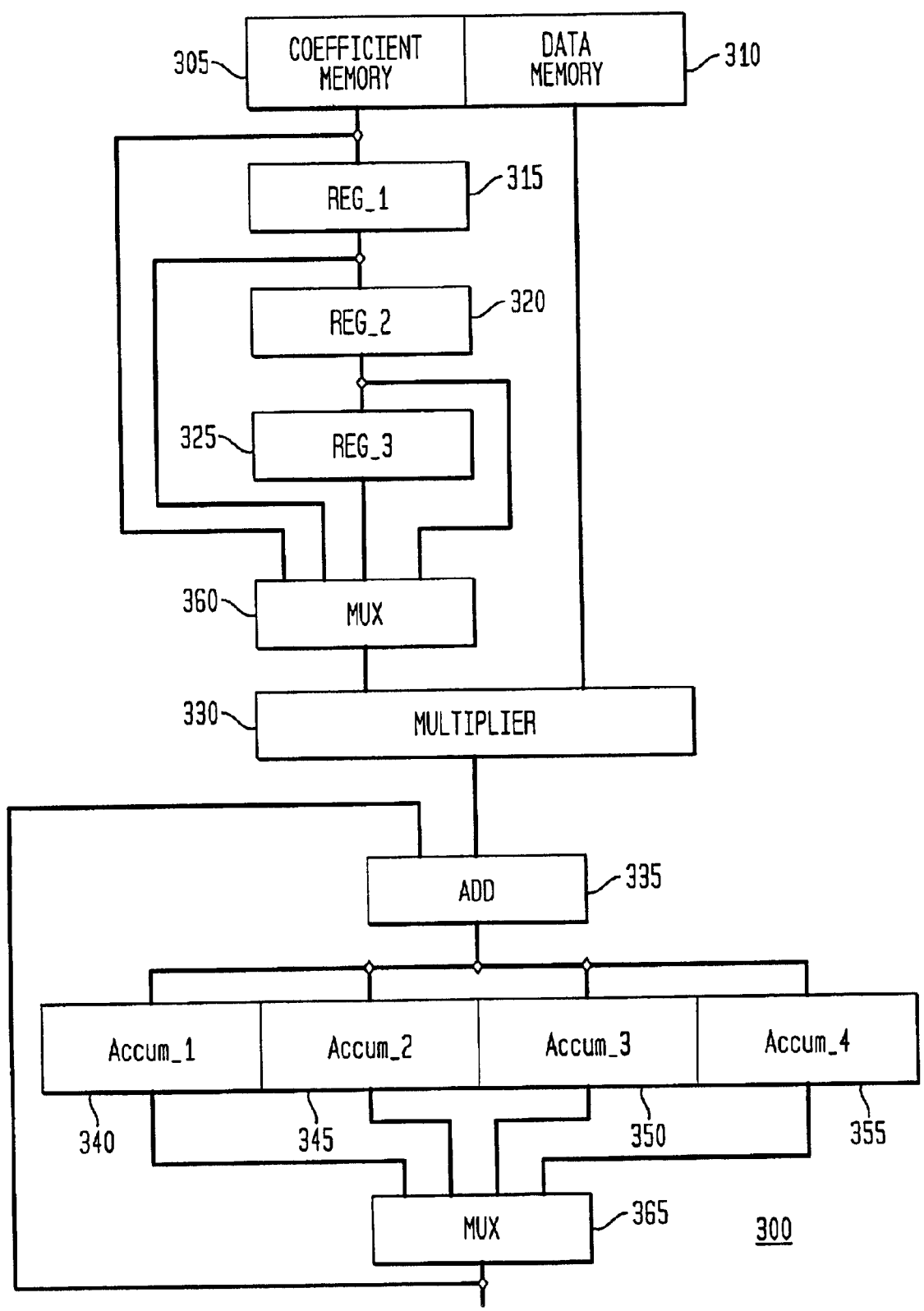
FIGS. 5A through 5E are block diagrams illustrating, in detail, exemplary fixed and specific computational elements, forming computational units, in accordance with the present invention.

FIG. 5A is a block diagram illustrating a four-point asymmetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
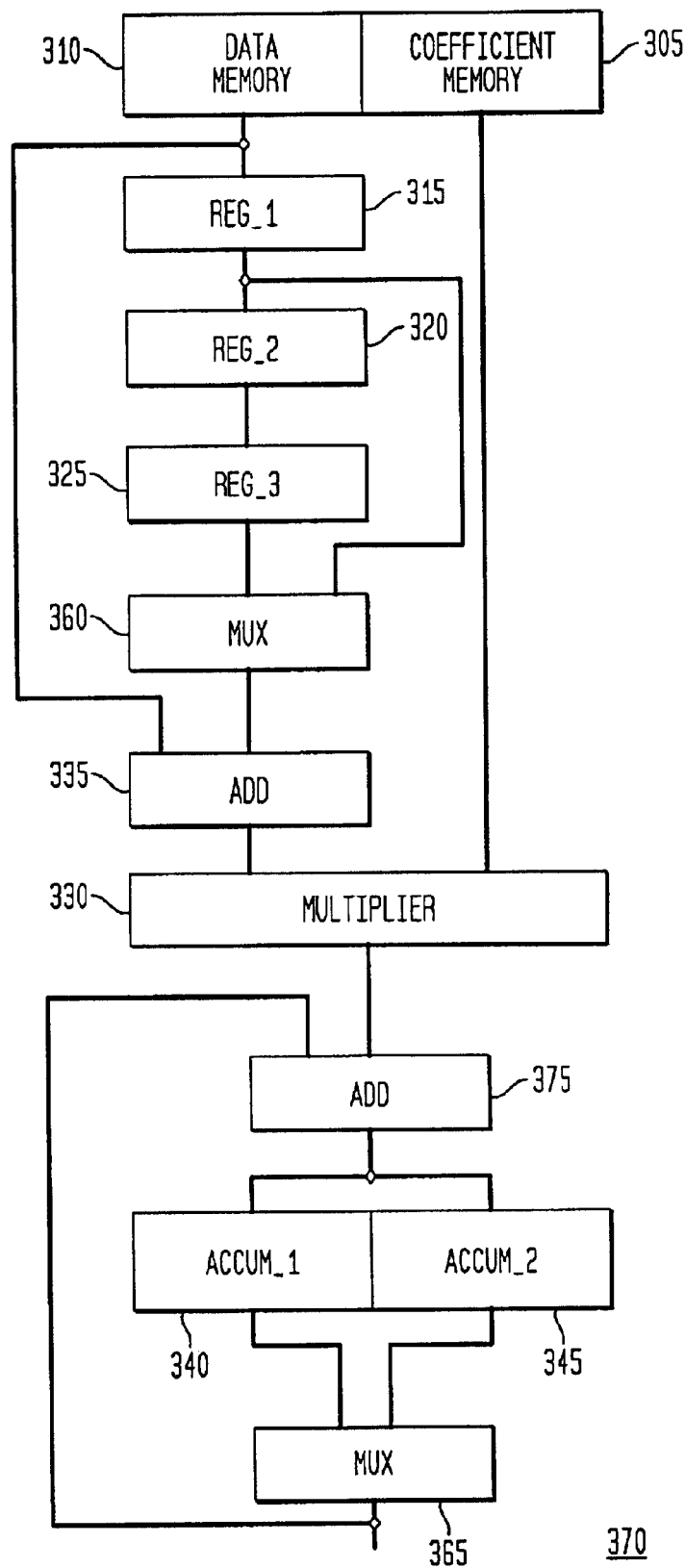

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
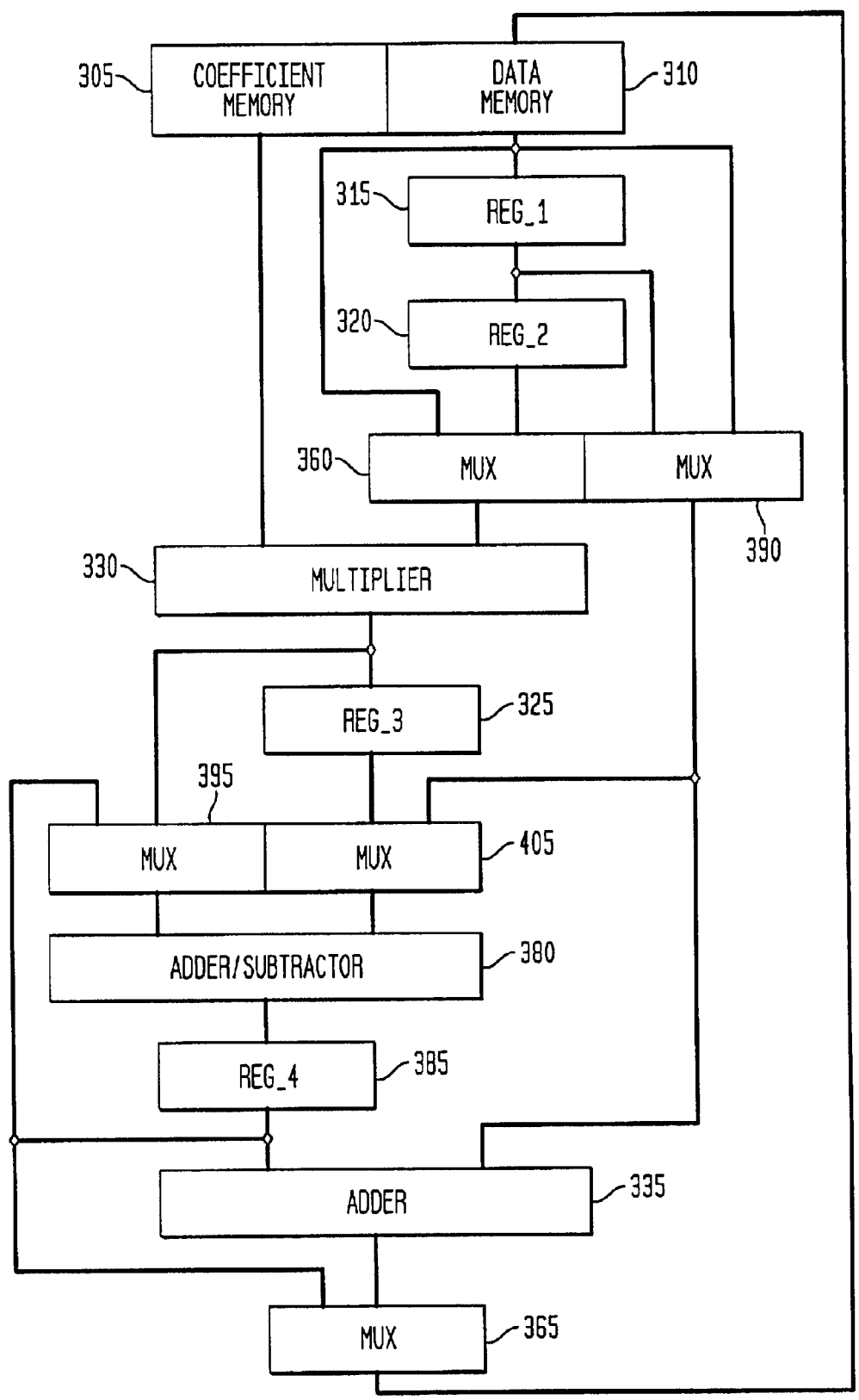

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtractor 380, with multiplexers (MUXes) 360, 365, 390, 395 and 405 forming a portion of the interconnection network (210, 220 and 240).

Figure 5D:
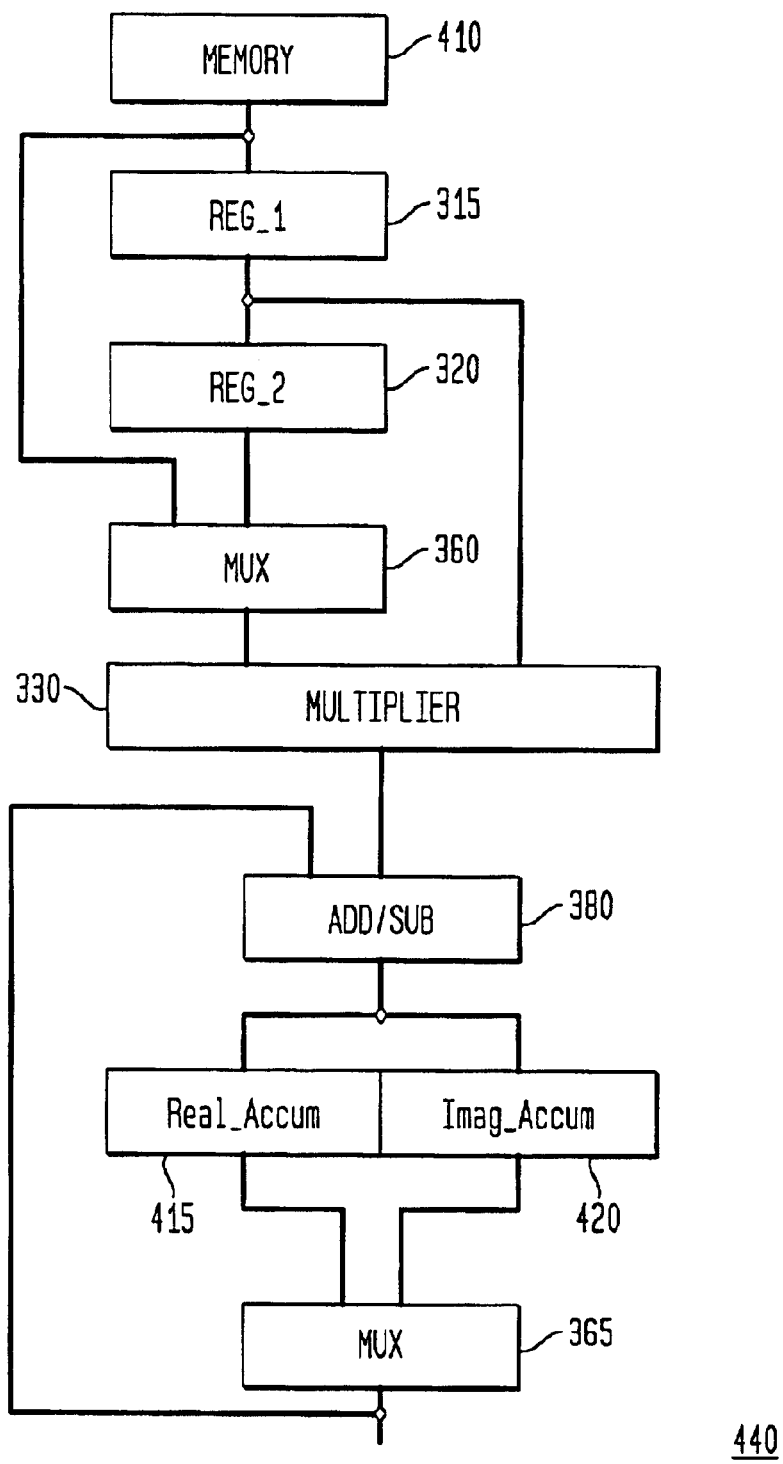

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtractor 380, and real and imaginary accumulator registers 415 and 420, also with multiplexers (MUXes) 360 and 365 forming a portion of the interconnection network (210, 220 and 240).

Figure 5E:
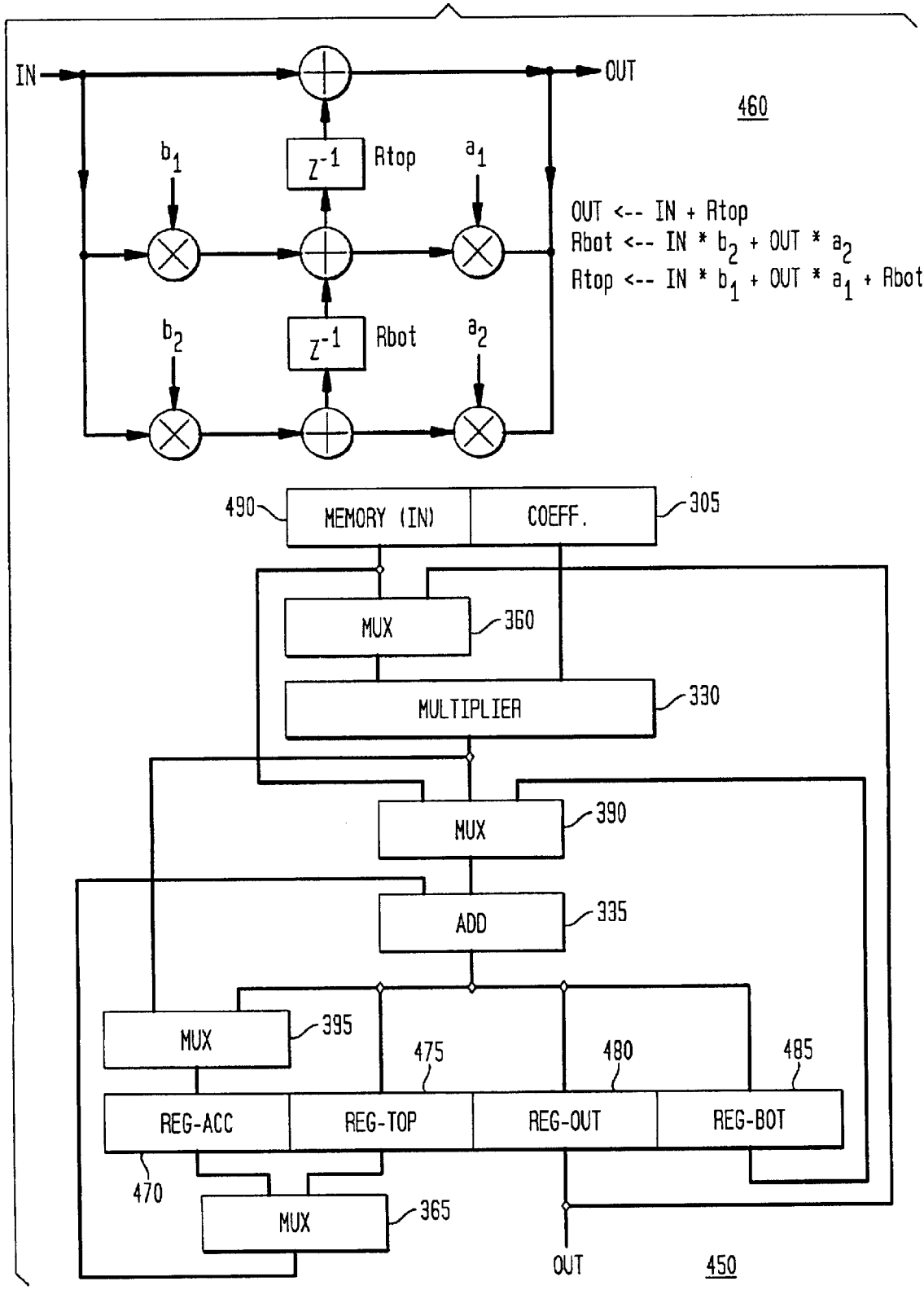

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

Figure 6:
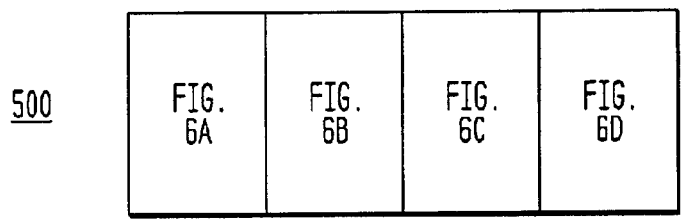
FIG. 6 is a block diagram illustrating, in detail, a preferred multifunction adaptive computational unit having a plurality of different, fixed computational elements, in accordance with the present invention.
Figure 6A:
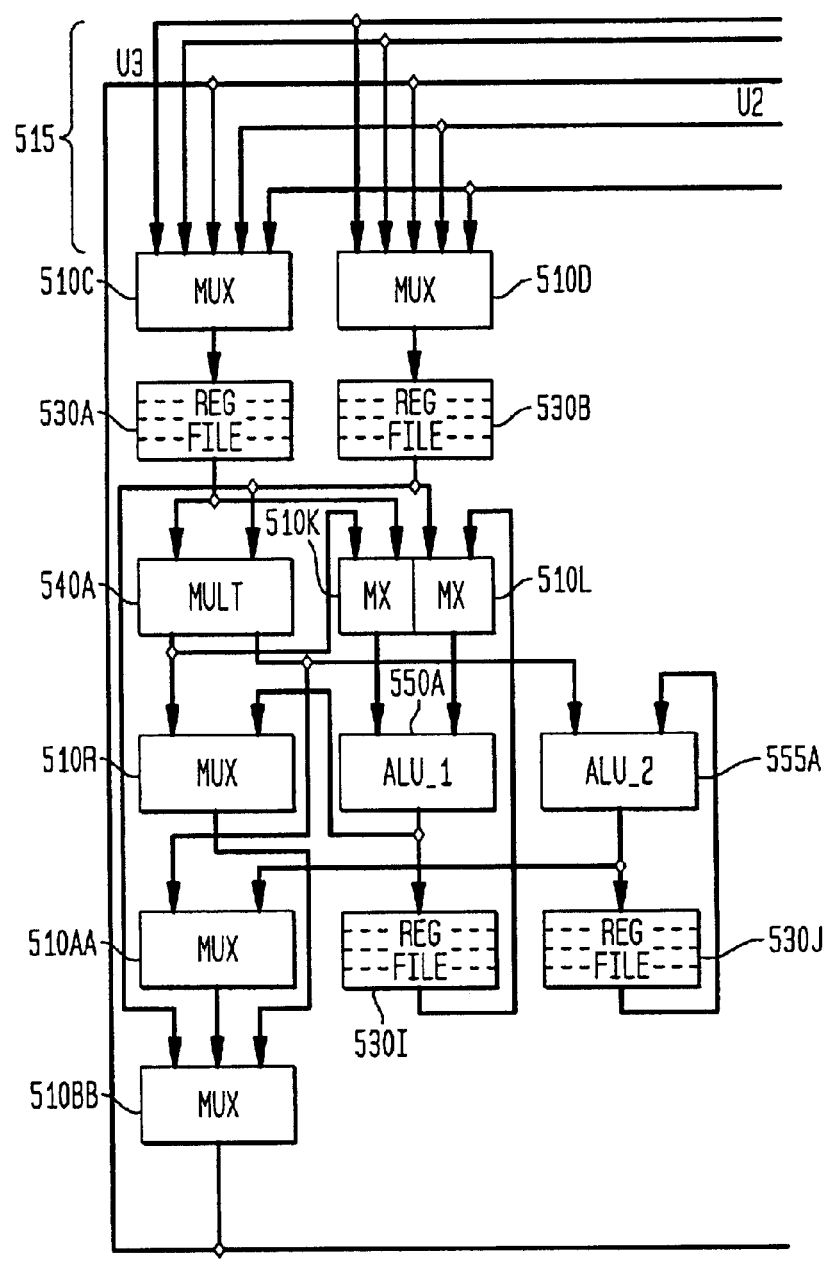
Figure 6B:
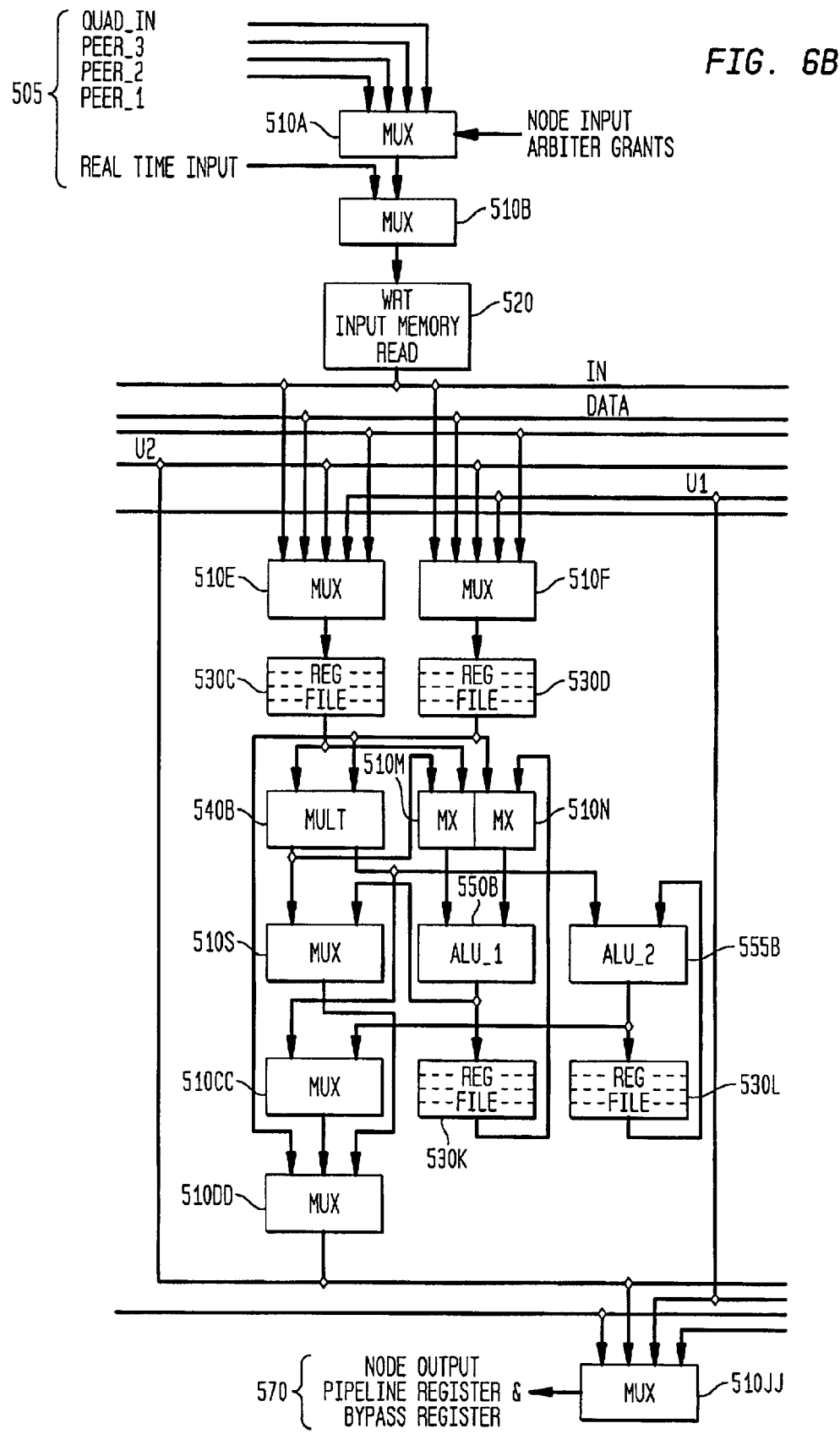
Figure 6C:
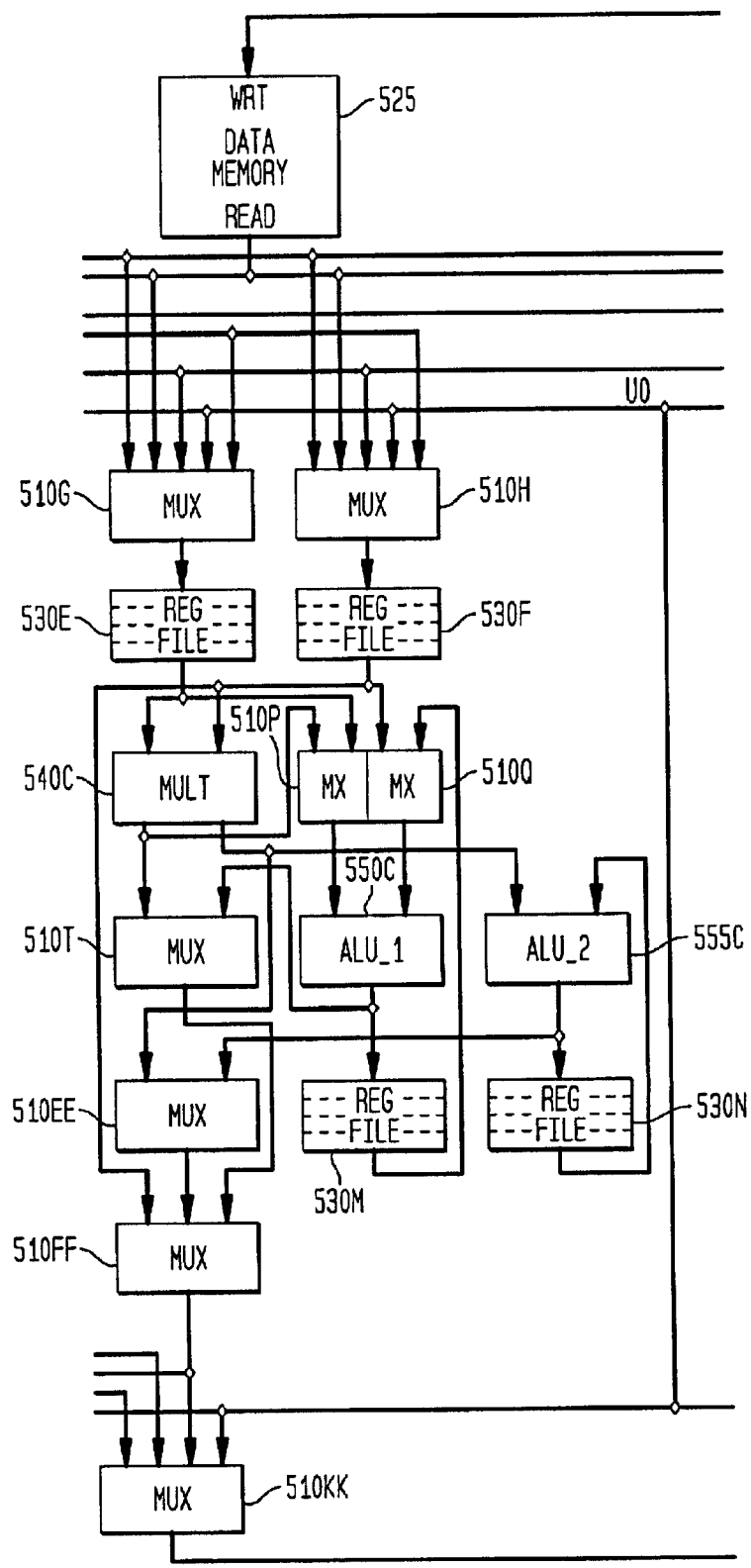
Figure 6D:
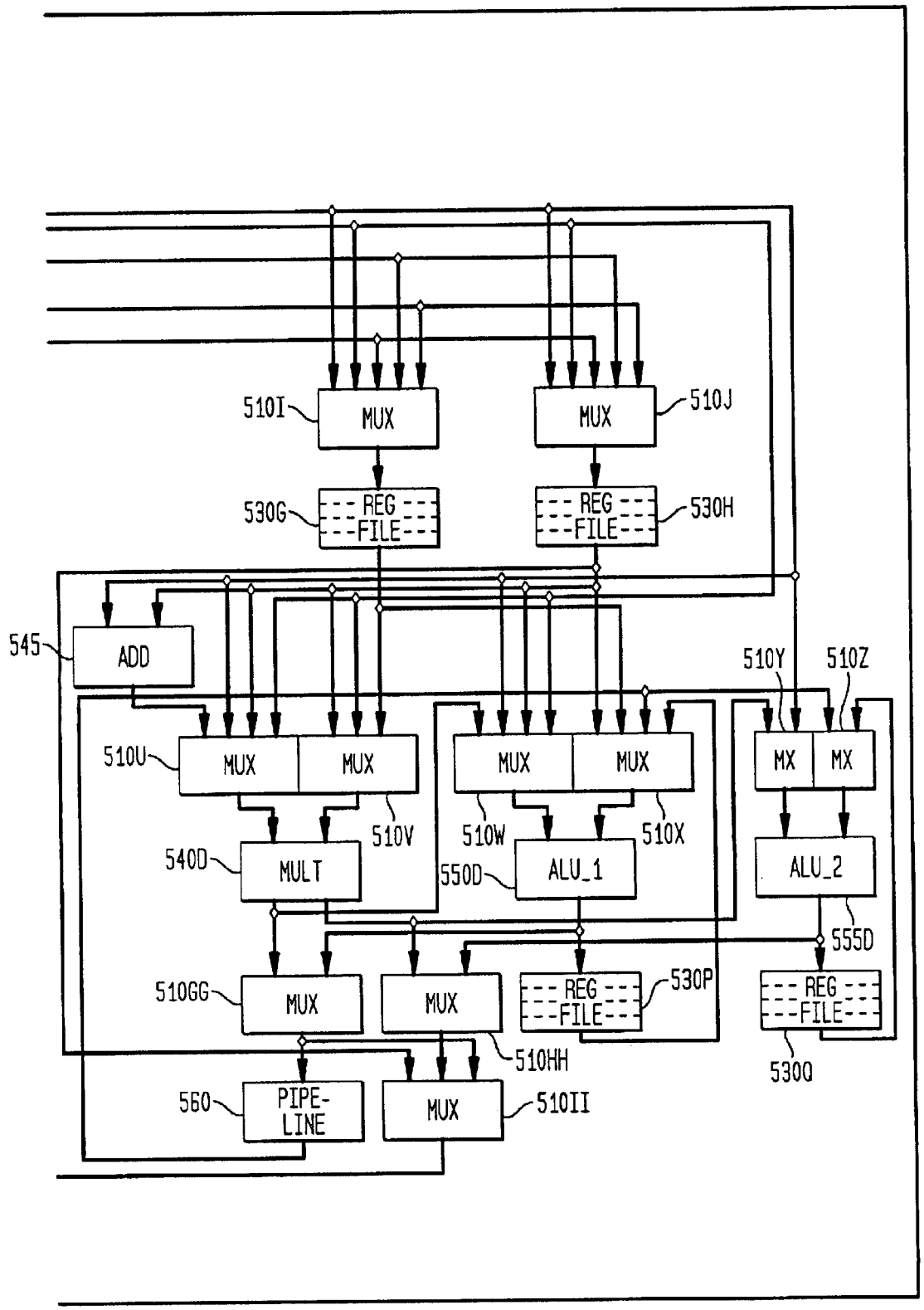

FIG. 6 is a block diagram illustrating, in detail, a preferred multifunction adaptive computational unit 500 having a plurality of different, fixed computational elements, in accordance with the present invention. When configured accordingly, the adaptive computation unit 500 performs each of the various functions previously illustrated with reference to FIG. 5A though 5E, plus other functions such as discrete cosine transformation. As illustrated, this multifunction adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
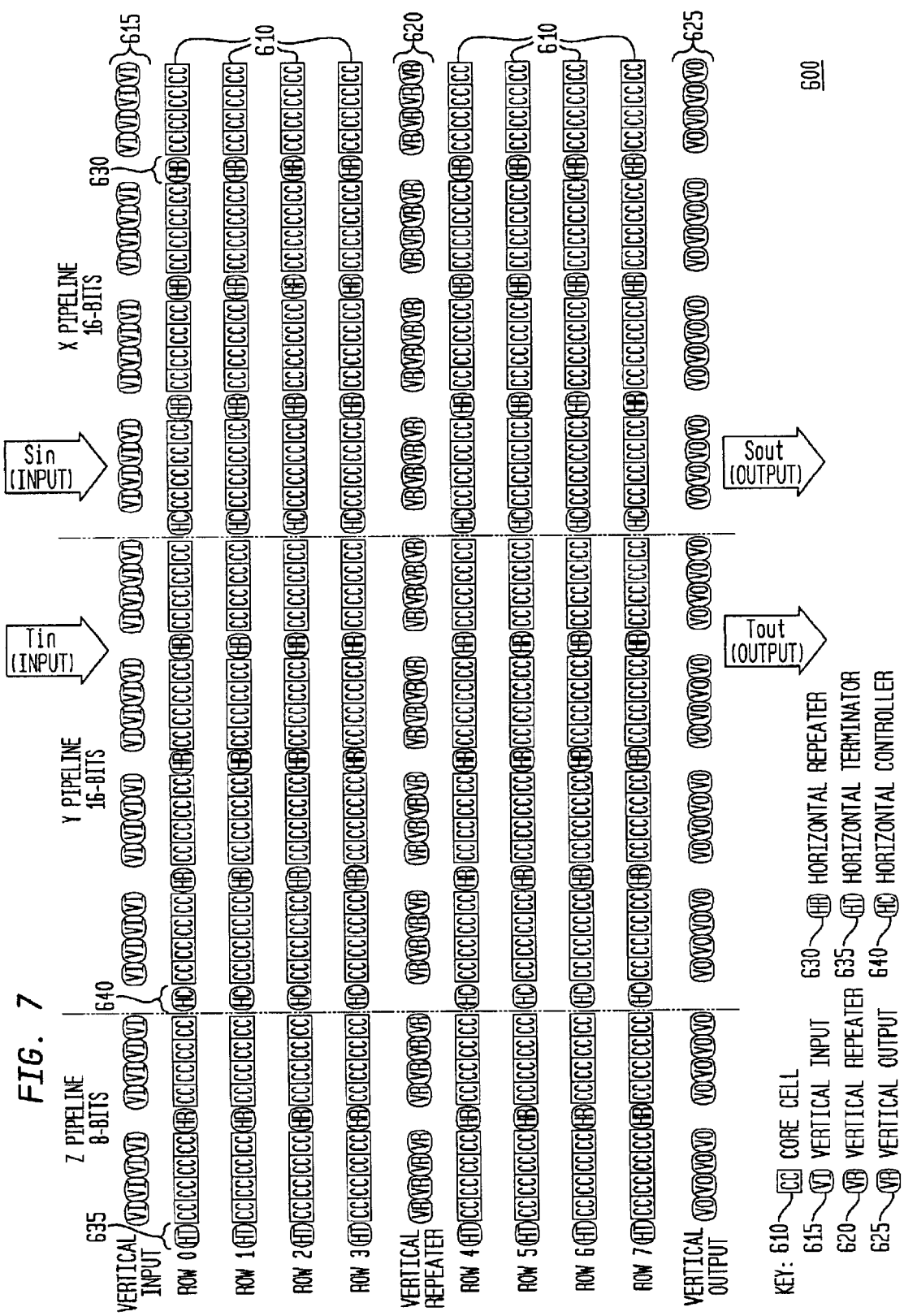
FIG. 7 is a block diagram illustrating, in detail, a preferred adaptive logic processor computational unit having a plurality of fixed computational elements, in accordance with the present invention.

FIG. 7 is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
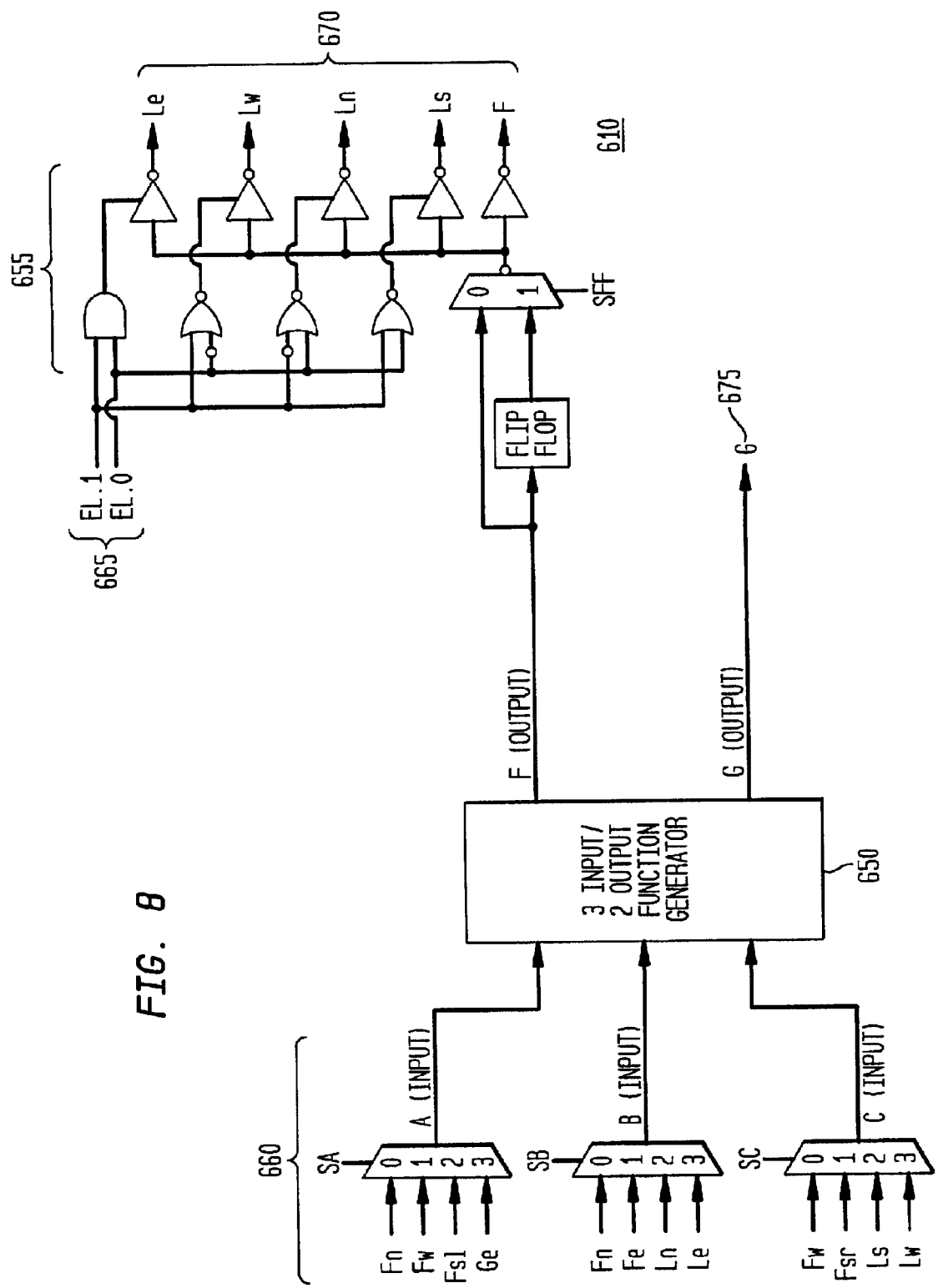
FIG. 8 is a block diagram illustrating, in greater detail, a preferred core cell of an adaptive logic processor computational unit with a fixed computational element, in accordance with the present invention.

FIG. 8 is a block diagram illustrating, in greater detail, a preferred core cell 610 of an adaptive logic processor computational unit 600 with a fixed computational element 650, in accordance with the present invention. The fixed computational element is a 3input—2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
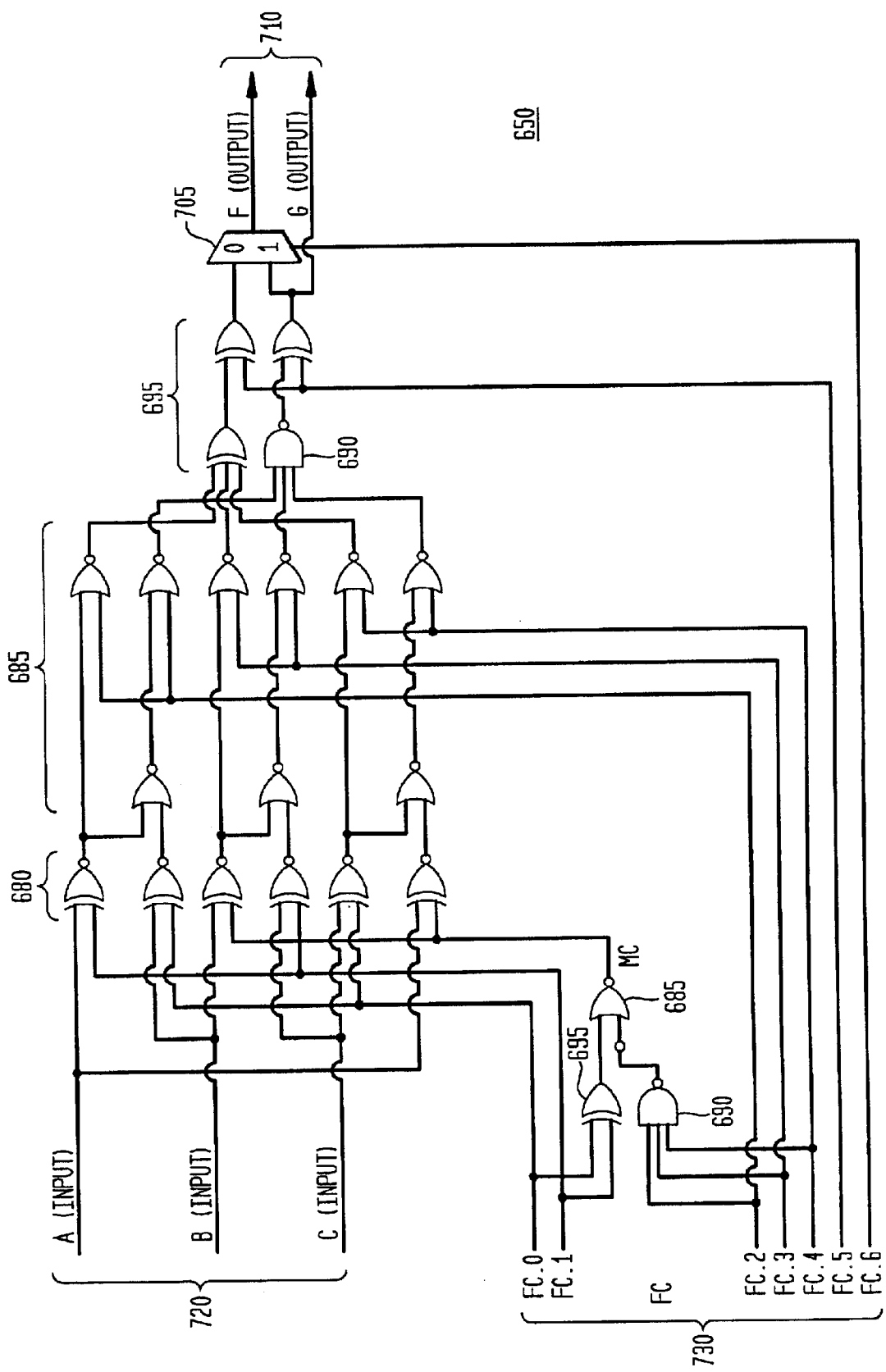
FIG. 9 is a block diagram illustrating, in greater detail, a preferred fixed computational element of a core cell of an adaptive logic processor computational unit, in accordance with the present invention.

FIG. 9 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to as an adaptive computing architecture. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Other advantages of the present invention may be further apparent to those of skill in the art. For mobile communications, for example, hardware acceleration for one or two algorithmic elements has typically been confined to infrastructure base stations, handling many (typically 64 or more) channels. Such an acceleration may be cost justified because increased performance and power savings per channel, performed across multiple channels, results in significant performance and power savings. Such multiple channel performance and power savings are not realizable, using prior a hardware acceleration, in a single operative channel mobile terminal (or mobile unit). In contrast, however, through use of the present invention, cost justification is readily available, given increased performance and power saving, because the same IC area may be configured and reconfigured to accelerate multiple algorithmic tasks, effectively generating or bringing into existence a new hardware accelerator for each next algorithmic element.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in real-time, and is capable of having corresponding, multiple modes of operation. In addition, through the selection of particular functions for reconfigurable acceleration, the ACE 100 minimizes power consumption and is suitable for low power applications, such as for use in hand-held and other battery-powered devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An adaptive computing integrated circuit, comprising:
    a first plurality of heterogeneous computational elements,
        a first computational element of the first plurality of heterogeneous computational elements having a first fixed architecture and a second computational element of the first plurality of heterogeneous computational elements having a second fixed architecture;
    a first interconnection network coupled to the first plurality of heterogeneous computational elements, the first interconnection network capable of configuring the plurality of heterogeneous computational elements for a first functional mode of a plurality of functional modes in response to first configuration information, and the first interconnection network further capable of reconfiguring the first plurality of heterogeneous computational elements for a second functional mode of the plurality of functional modes in response to second configuration information;
    a second plurality of heterogeneous computational elements, the second plurality of heterogeneous computational elements having a different set of computational elements than the first plurality of heterogeneous computational elements, a third computational element of the second plurality of heterogeneous computational elements having a third fixed architecture and a fourth computational element of the second plurality of heterogeneous computational elements having a fourth fixed architecture, wherein the first, second, third and fourth fixed architectures are each different fixed architectures;
    a second interconnection network coupled to the second plurality of heterogeneous computational elements, the second interconnection network capable, independently from the configuration and reconfiguration of the first plurality of heterogeneous computational elements by the first interconnection network, of configuring the second plurality of heterogeneous computational elements for a third functional mode of the plurality of functional modes in response to third configuration information, and of reconfiguring the second plurality of heterogeneous computational elements for a fourth functional mode of the plurality of functional modes in response to fourth configuration information, wherein the first, second, third and fourth functional modes are each different functional modes; and
    a third interconnection network coupled to the first plurality of heterogeneous computational elements and to the second plurality of heterogeneous computational elements, the third interconnection network capable of selectively routing data and control information to and from the first and second pluralities of heterogeneous computational elements.

2. The adaptive computing integrated circuit of claim 1, wherein the first, second, third and fourth fixed architectures are selected from a plurality of specific architectures, the plurality of specific architectures having at least two of the following corresponding functions: memory, addition, multiplication, complex multiplication, subtraction, configuration, reconfiguration, control, input, output, and field programmability.

3. The adaptive computing integrated circuit of claim 1, wherein the plurality of functional modes comprises at least two of the following functional modes: linear algorithmic operations, non-linear algorithmic operations, finite state machine operations, memory operations, and bit-level manipulations.

4. The adaptive computing integrated circuit of claim 1, wherein the first, second, third and fourth are selected to comparatively minimize power consumption of the adaptive computing integrated circuit.

5. The adaptive computing integrated circuit of claim 1, wherein the interconnection network reconfigurably routes a plurality of configuration information to or between the first and second pluralities of heterogeneous computational elements.

6. The adaptive computing integrated circuit of claim 1, wherein the first configuration information, the second configuration information, the third configuration information and the fourth configuration information are commingled with data to form a singular bit stream.

7. The adaptive computing integrated circuit of claim 1, further comprising:

a controller coupled to the first and second pluralities of heterogeneous computational elements and to the third interconnection network, the controller capable of directing and scheduling the configurations and reconfigurations of the first and second pluralities of heterogeneous computational elements for the plurality of functional modes.

8. The adaptive computing integrated circuit of claim 7, wherein the controller is further capable of timing and scheduling the configuration and reconfiguration of the first and second pluralities of heterogeneous computational elements with corresponding data.

9. The adaptive computing integrated circuit of claim 7, wherein the controller is further capable of selecting the first configuration information, the second configuration information, the third configuration information, and the fourth configuration information from a singular bit stream containing data commingled with a plurality of configuration information.

10. The adaptive computing integrated circuit of claim 1, further comprising:

a memory coupled to the first and second pluralities of heterogeneous computational elements and to the third interconnection network, the memory capable of storing the first configuration information, the second configuration information, the third configuration information and the fourth configuration information.

11. The adaptive computing integrated circuit of claim 1, wherein the first and second pluralities of heterogeneous computational elements are configured and reconfigured respectively through the first and second interconnection network, and in response to a plurality of configuration information, to implement a plurality of logic functions of a data flow graph.

12. The adaptive computing integrated circuit of claim 1, wherein the first and second interconnection networks are further configured to perform a plurality of logic decisions of a data flow graph.

13. The adaptive computing integrated circuit of claim 1, wherein the first and second pluralities of heterogeneous computational elements may be configured to form a plurality of adaptive and heterogeneous computational units.

14. The adaptive computing integrated circuit of claim 13, wherein each computation unit of the plurality of heterogeneous computation units further comprises:

a computational unit controller coupled to the first or second plurality of heterogeneous computational elements, the computational unit controller responsive to a plurality of configuration information to generate a plurality of control bits;

a plurality of input multiplexers, the plurality of input multiplexers responsive to the plurality of control bits to select an input line from the interconnection network for the reception of input information; and a plurality of output demultiplexers, the plurality of output demultiplexers responsive to the plurality of control bits to select a plurality of output lines from the respective first or second interconnection network for the transfer of output information.

15. The adaptive computing integrated circuit of claim 13, wherein the plurality of computation units is configured to form a plurality of reconfigurable matrices.

16. The adaptive computing integrated circuit of claim 1 wherein the adaptive computing integrated circuit is embodied within a mobile terminal having a plurality of operating modes.

17. The adaptive computing integrated circuit of claim 16, wherein the plurality of operating modes of the mobile terminal comprises at least two of the following modes: a mobile telecommunication mode, a personal digital assistance mode, a multimedia reception mode, a mobile packet-based communication mode, and a paging mode.

18. A method for adaptive computing comprising:

in response to a first plurality of configuration information, configuring and reconfiguring through a first interconnection network a first plurality of heterogeneous computational elements for a first plurality of functional modes, the first plurality of heterogeneous computational elements forming a first reconfigurable architecture;

in response to a second plurality configuration information, independently configuring and reconfiguring through a second interconnection network a second plurality of heterogeneous computational elements for a second plurality of functional modes, the second plurality of heterogeneous computational elements forming a second reconfigurable architecture, wherein the second plurality of functional modes are different from the first plurality of functional modes and wherein the second reconfigurable architecture is different from the first reconfigurable architecture; and reconfigurably routing, through a third interconnection network data and control information to and from the first and second pluralities of heterogeneous computational elements.

19. The adaptive computing method of claim 18, wherein the first and second pluralities of heterogeneous computational elements each comprise a plurality of fixed architectures, the plurality of fixed architectures having at least two of the following corresponding functions: memory, addition, multiplication, complex multiplication, subtraction, configuration, reconfiguration, control, input, output, and field programmability.

20. The adaptive computing method of claim 18, wherein the first and second pluralities plurality of functional modes each comprise at least two of the following functional modes: linear algorithmic operations, non-linear algorithmic operations, finite state machine operations, memory operations and bit-level manipulations.

21. The adaptive computing method of claim 18, wherein the first and second pluralities of heterogeneous computational elements are selected to comparatively minimize power consumption of the adaptive computing integrated circuit.

22. The adaptive computing method of claim 18, further comprising:

reconfigurably routing, through the third interconnection network, data a plurality of configuration information to or between the first and second pluralities heterogeneous computational elements.

23. The adaptive computing method of claim 18, wherein the first and second pluralities of configuration information are commingled with data to form a singular bit stream.

24. The adaptive computing method of claim 18, further comprising:

directing and scheduling the configuration and reconfiguration of the first and second pluralities of heterogeneous computational elements for the first and second pluralities of functional modes.

25. The adaptive computing method of claim 18, further comprising:
    timing and scheduling the configuration and reconfiguration of the first and second pluralities of heterogeneous computational elements with corresponding data.

26. The adaptive computing method of claim 18, further comprising:
    selecting the first and second pluralities of configuration information from a singular bit stream comprising data commingled with configuration information.

27. The adaptive computing method of claim 18, further comprising:
    storing in a memory the first and second pluralities of configuration information.

28. The adaptive computing method of claim 18, wherein the first and second pluralities plurality of heterogeneous computational elements are configured and reconfigured through the respective first and second interconnection network, and in response to the respective first and second pluralities of configuration information, to implement a plurality of logic functions of a data flow graph.

29. The adaptive computing method of claim 18, wherein the first and second interconnection networks are further configured to perform a plurality of logic decisions of a data flow graph.

30. The adaptive computing method of claim 18, further comprising:
    generating a plurality of control bits;
    in response to the plurality of control bits, selecting an input line from the first or second interconnection networks for the reception of input information; and
    in response to the plurality of control bits, selecting an output line from the respective first or second interconnection network for the transfer of output information.

31. The adaptive computing method of claim 18, wherein the adaptive computing method is operable within a mobile terminal having a plurality of operating modes.

32. The adaptive computing method of claim 31, wherein the plurality of operating modes of the mobile terminal comprises at least two of the following modes: a mobile telecommunication mode, a personal digital ass stance mode, a multimedia reception mode, a mobile packet-based communication mode, and a paging mode.

33. An adaptive computing integrated circuit, comprising:
    a plurality of heterogeneous reconfigurable matrices comprising at least two distinct and different matrix architectures, each heterogeneous reconfigurable matrix of the plurality of heterogeneous reconfigurable matrices comprising a plurality of heterogeneous computation units, wherein each of the plurality of heterogeneous computation units are formed from a selected configuration, of a plurality of configurations, of a plurality of fixed computational elements, a first computational element of the plurality of fixed computational elements having a first fixed architecture and a second computational element of the plurality of fixed computational elements having a second fixed architecture, wherein the first fixed architecture is different from the second fixed architecture, and wherein each of the plurality of heterogeneous computation units is coupled to a corresponding first interconnect network and configurable and reconfigurable in response to a first plurality of configuration information for a corresponding plurality of functional modes and
    a second interconnection network coupled to the plurality of heterogeneous reconfigurable matrices, the second matrix interconnection network capable of configuring and reconfiguring the plurality of heterogeneous reconfigurable matrices in response to a second plurality of configuration information for a corresponding plurality of operating modes.

34. The adaptive computing integrated circuit of claim 33, wherein each computation unit of the plurality of heterogeneous computation units is selectively reconfigurable and capable of executing a distinct algorithm of a plurality of algorithms.

35. The adaptive computing integrated circuit of claim 33, further comprising:
    a controller coupled to the plurality of heterogeneous reconfigurable matrices, the controller capable of providing the first and second pluralities of configuration information to the heterogeneous reconfigurable matrices and to the second interconnection network.

36. The adaptive computing integrated circuit of claim 35, wherein the controller is further capable of detecting and selecting the first and second pluralities of configuration information from a singular input bit stream comprised of commingled data and the first and second pluralities of configuration information.

37. The adaptive computing integrated circuit of claim 35, wherein the controller is embodied as a predetermined configuration of a heterogeneous reconfigurable matrix of the plurality of heterogeneous reconfigurable matrices.

38. The adaptive computing integrated circuit of claim 35, wherein the controller is further capable of directing and scheduling the configuration and reconfiguration of the plurality of fixed computational elements for the plurality of functional modes.

39. The adaptive computing integrated circuit of claim 35, wherein the controller is further capable of timing and scheduling the configuration and reconfiguration of the plurality of fixed computational elements using corresponding data.

40. The adaptive computing integrated circuit of claim 35, further comprising:
    a memory coupled to the controller and to the plurality of heterogeneous reconfigurable matrices, the memory capable of storing the first and second pluralities of configuration information.

41. The adaptive computing integrated circuit of claim 40, wherein the memory is embodied as a predetermined configuration of a heterogeneous reconfigurable matrix of the plurality of heterogeneous reconfigurable matrices.

42. The adaptive computing integrated circuit of claim 33, wherein the plurality of operating modes comprises a first operating mode and a second operating mode, the first operating mode being different than the second operating mode.

43. The adaptive computing integrated circuit of claim 33, wherein the first fixed architecture and the second fixed architecture are selected from a plurality of specific architectures, the plurality of specific architectures having at least two of the following corresponding functions: memory, addition, multiplication, complex multiplication, subtraction, configuration, reconfiguration, control, input, output, and field programmability.

44. The adaptive computing integrated circuit of claim 33, wherein the plurality of operating modes comprises at least two of the following operating modes: linear algorithmic operations, non-linear algorithmic operations, finite state machine operations, memory operations, and bit-level manipulations.

45. The adaptive computing integrated circuit of claim 33, wherein the first fixed architecture and the second fixed architecture are selected to comparatively minimize power consumption of the adaptive computing integrated circuit.

46. The adaptive computing integrated circuit of claim 33, wherein the second interconnection network reconfigurably routes data and control information between and among the plurality of heterogeneous reconfigurable matrices.

47. The adaptive computing integrated circuit of claim 33, wherein the first and second pluralities of configuration information are commingled with data to form a singular bit stream.

48. An adaptive computing integrated circuit, comprising:
  a first plurality of heterogeneous computational elements, a first computational element of the plurality of heterogeneous computational elements having a first fixed architecture and a second computational element of the plurality of heterogeneous computational elements having a second fixed architecture;
  a first interconnection network coupled to the first plurality of heterogeneous computational elements, the first interconnection network capable of configuring and reconfiguring the first plurality of heterogeneous computational elements for a first plurality of functional modes in response to first plurality of configuration information;
  a second plurality of heterogeneous computational elements, a third computational element of the second plurality of heterogeneous computational elements having a third fixed architecture and a fourth computational element of the second plurality of heterogeneous computational elements having a fourth fixed architecture, wherein the first, second, third and fourth fixed architectures are each different fixed architectures;
  a second interconnection network coupled to the second plurality of heterogeneous computational elements, the second interconnection network capable of configuring and reconfiguring the second plurality of heterogeneous computational elements for a second plurality of functional modes in response to a second plurality of configuration information, wherein the first plurality of functional modes and the second plurality of functional modes are each different pluralities of functional modes;
  a third interconnection network coupled to the first plurality of heterogeneous computational elements and to the second plurality of heterogeneous computational elements, the third interconnection network capable of selectively routing data and control information to and from the first and second pluralities of heterogeneous computational elements;
  a third plurality of heterogeneous computational elements coupled to the third interconnection network, the third plurality of heterogeneous computational elements configured for a controller operating mode, the controller operating mode comprising functions for directing configuration and reconfiguration of the first and second pluralities of heterogeneous computational elements, for selecting the first and second pluralities of configuration information from a singular bit stream comprising data commingled with the first and second pluralities of configuration information, and for scheduling the configuration and reconfiguration of the first and second pluralities of heterogeneous computational elements with corresponding data; and
  a fourth plurality of heterogeneous computational elements coupled to the third interconnection network, the fourth plurality of heterogeneous computational elements configured for a memory operating mode for storing the first and second pluralities of configuration information.

49. The adaptive computing integrated circuit of claim 48, wherein the first fixed architecture and the second fixed architecture are selected from a plurality of fixed architectures, the plurality of fixed architectures having at least two of the following corresponding functions: memory, addition, multiplication, complex multiplication, subtraction, configuration, reconfiguration, control, input, output, and field programmability.

50. The adaptive computing integrated circuit of claim 48, wherein the first and second pluralities plurality of functional modes each comprise at least two of the following functional modes: linear algorithmic operations, non-linear algorithmic operations, finite state machine operations, memory operations, and bit-level manipulations.

51. The adaptive computing integrated circuit of claim 48, wherein the adaptive computing integrated circuit is embodied within a mobile terminal having a plurality of operating modes.

52. The adaptive computing integrated circuit of claim 51, wherein the plurality of operating modes of the mobile terminal comprises at least two of the following modes: a mobile telecommunication mode, a personal digital assistance mode, a multimedia reception mode, a mobile packet-based communication mode, and a paging mode.

53. An adaptive computing integrated circuit, comprising:
  a first plurality of heterogeneous computational elements, a first computational element of the first plurality of heterogeneous computational elements having a first fixed architecture of a plurality of fixed architectures and a second computational element of the plurality of heterogeneous computational elements having a second fixed architecture of the plurality of fixed architectures, and the plurality of fixed architectures having functions for memory, addition, multiplication, complex multiplication, subtraction, configuration, reconfiguration, control, input, output, and field programmability;
  a first interconnection network coupled to the first plurality of heterogeneous computational elements, the first interconnection network capable of configuring the first plurality of heterogeneous computational elements for first functional mode of a plurality of functional modes in response to first configuration information, and the first interconnection network further capable of reconfiguring the first plurality of heterogeneous computational elements for a second functional mode of the plurality of functional modes in response to second configuration information;
  a second plurality of heterogeneous computational elements, a third computational element of the second plurality of heterogeneous computational elements having a third fixed architecture of the plurality of fixed architectures and a fourth computational element of the second plurality of heterogeneous computational elements having a fourth fixed architecture of the plurality of fixed architectures, wherein the first, second, third and fourth fixed architectures are each different fixed architectures;
  a second interconnection network coupled to the second plurality of heterogeneous computational elements, the second interconnection network capable of configuring the second plurality of heterogeneous computational elements for a third functional mode of a plurality of functional modes in response to third configuration information, and the second interconnection network further capable of reconfiguring the second plurality of heterogeneous computational elements for a fourth functional mode of the plurality of functional modes in response to fourth configuration information, wherein the first, second, third and fourth functional modes are each different functional modes of the plurality of functional modes;

a third interconnection network coupled to the first plurality of heterogeneous computational elements and to the second plurality of heterogeneous computational elements, the third interconnection network capable of selectively routing data and control information to and from the first and second pluralities of heterogeneous computational elements.

54. The adaptive computing integrated circuit of claim 53, wherein the plurality of functional modes comprises at least two of the following functional modes: linear algorithmic operations, non-linear algorithmic operations, finite state machine operations, memory operations, and bit-level manipulations.

55. The adaptive computing integrated circuit of claim 53, wherein the plurality of fixed architectures are selected to comparatively minimize power consumption of the adaptive computing integrated circuit.

56. The adaptive computing integrated circuit of claim 53, wherein the third interconnection network reconfigurably routes a plurality of configuration information to or between the first and second pluralities of heterogeneous computational elements.

57. The adaptive computing integrated circuit of claim 56, wherein the plurality of configuration information is commingled with data to form a singular bit stream.

58. The adaptive computing integrated circuit of claim 53, further comprising:
a controller coupled to the first and second pluralities of heterogeneous computational elements and to the third interconnection network, the controller capable of directing and scheduling the configuration of the first and second pluralities of heterogeneous computational elements for the plurality of functional modes.

59. The adaptive computing integrated circuit of claim 58, wherein the controller is further capable of timing and scheduling the configuration and reconfiguration of the first and second pluralities plurality of heterogeneous computational elements with corresponding data.

60. The adaptive computing integrated circuit of claim 59, wherein the controller is further capable of selecting the first, second, third and fourth configuration information from a singular bit stream comprising data commingled with a plurality of configuration information.

61. The adaptive computing integrated circuit of claim 53, further comprising:
a memory coupled to the first and second pluralities of heterogeneous computational elements and to the third interconnection network, the memory capable of storing the first, second, third and fourth configuration information.

62. The adaptive computing integrated circuit of claim 53, wherein the adaptive computing integrated circuit is embodied within a mobile terminal having a plurality of operating modes.

63. The adaptive computing integrated circuit of claim 62, wherein the plurality of operating modes of the mobile terminal comprises at least two of the following modes: a mobile telecommunication mode, a personal digital assistance mode, a multimedia reception mode, a mobile packet-based communication mode, and a paging mode.

64. An adaptive computing integrated circuit, comprising:
a first plurality of heterogeneous computational elements, a first computational element of the first plurality of heterogeneous computational elements having a first fixed architecture and a second computational element of the first plurality of heterogeneous computational elements having a second fixed architecture;

a first interconnection network coupled to the first plurality of heterogeneous computational elements, the first interconnection network capable of configuring the first plurality of heterogeneous computational elements for first functional mode of a plurality of functional modes in response to first configuration information, and the first interconnection network further capable of reconfiguring the first plurality of heterogeneous computational elements for a second functional mode of the plurality of functional modes in response to second configuration information, and the plurality of functional modes comprising at least two of the following functional modes: linear algorithmic operations, non-linear algorithmic operations, finite state machine operations, memory operations, and bit-level manipulations;

a second plurality of heterogeneous computational elements a third computational element of the second plurality of heterogeneous computational elements having a third fixed architecture and a fourth computational element of the second plurality of heterogeneous computational elements having a fourth fixed architecture, wherein the first, second, third and fourth fixed architectures are each different fixed architectures;

a second interconnection network coupled to the second plurality of heterogeneous computational elements, the second interconnection network capable of configuring the second plurality of heterogeneous computational elements or a third functional mode of a plurality of functional modes in response to third configuration information, and the second interconnection network further capable of reconfiguring the second plurality of heterogeneous computational elements for a fourth functional mode of the plurality of functional modes in response to fourth configuration information, wherein the first, second, third and fourth functional modes are each different functional modes of the plurality of functional modes; and a third interconnection network coupled to the first plurality of heterogeneous computational elements and to the second plurality of heterogeneous computational elements, the third interconnection network capable of selectively routing data and control information to and from the first and second pluralities of heterogeneous computational elements.

65. The adaptive computing integrated circuit of claim 64, wherein the first fixed architecture and the second fixed architecture are selected from a plurality of specific architectures, the plurality of specific architectures having functions for memory, addition, multiplication, complex multiplication, subtraction, configuration, reconfiguration, control, input, output, and field programmability.

66. The adaptive computing integrated circuit of claim 64, wherein the first fixed architecture and the second fixed architecture are selected to comparatively minimize power consumption of the adaptive computing integrated circuit.

67. The adaptive computing integrated circuit of claim 64, wherein the interconnection network reconfigurably routes a plurality of configuration information to or between the first and second pluralities of heterogeneous computational elements.

68. The adaptive computing integrated circuit of claim 67, wherein the plurality of configuration information is commingled with data to form a singular bit stream.

69. The adaptive computing integrated circuit of claim 64, further comprising:
a controller coupled to the first and second pluralities of heterogeneous computational elements and to the third interconnection network, the controller capable of directing and scheduling the configuration and reconfiguration of the first and second pluralities of heterogeneous computational elements for the plurality of functional modes.

70. The adaptive computing integrated circuit of claim 69, wherein the controller is further capable of timing and scheduling the configuration and reconfiguration of the first and second pluralities of heterogeneous computational elements with corresponding data.

71. The adaptive computing integrated circuit of claim 69, wherein the controller is further capable of selecting a plurality of configuration information from a singular bit stream comprising data commingled with the plurality of configuration information.

72. The adaptive computing integrated circuit of claim 64, further comprising:
a memory coupled to the first and second pluralities of heterogeneous computational elements and to the interconnection network, the memory capable of storing a plurality of configuration information.

73. The adaptive computing integrated circuit of claim 64, wherein the adaptive computing integrated circuit is embodied within a mobile terminal having a plurality of operating modes.

74. The adaptive computing integrated circuit of claim 73, wherein the plurality of operating modes of the mobile terminal comprises at least two of the following modes: a mobile telecommunication mode, a personal digital assistance mode, a multimedia reception mode, a mobile packet-based communication mode, and a paging mode.

75. An adaptive computing integrated circuit, comprising:
a plurality of heterogeneous computational elements, a first computational element of the plurality of heterogeneous computational elements having a first fixed architecture and a second computational element of the plurality of heterogeneous computational elements having a second fixed architecture, the first fixed architecture being different than the second fixed architecture;
an interconnection network coupled to the plurality of heterogeneous computational elements, the interconnection network capable of configuring the plurality of heterogeneous computational elements for a first functional mode of a plurality of functional modes in response to first configuration information, and the interconnection network further capable of reconfiguring the plurality of heterogeneous computational elements for a second functional mode of the plurality of functional modes in response to second configuration information, the first functional mode being different than the second functional mode;
a controller coupled to the plurality of heterogeneous computational elements, the controller responsive to a plurality of configuration information to generate a plurality of control bits;
a plurality of input multiplexers, the plurality of input multiplexers responsive to the plurality of control bits to select an input line from the interconnection network for the reception of input information; and
a plurality of output demultiplexers, the plurality of output demultiplexers responsive to the plurality of control bits to select a plurality of output lines from the interconnection network for the transfer of output information.

76. The adaptive computing integrated circuit of claim 75, wherein the first and second pluralities of heterogeneous computational elements are selected from a plurality of specific architectures having at least two of the following corresponding functions: memory, addition, multiplication, complex multiplication, subtraction, configuration, reconfiguration, control, input, output, and field programmability.

77. An adaptive computing integrated circuit, comprising:
a first computational unit having a first plurality of heterogeneous computational elements forming a first reconfigurable architecture, a first computational element of the first plurality of heterogeneous computational elements having a first fixed architecture and a second computational element of the first plurality of heterogeneous computational elements having a second fixed architecture, the first fixed architecture being different than the second fixed architecture;
a first interconnection network coupled to the first plurality of heterogeneous computational elements, the first interconnection network capable of configuring the first plurality of heterogeneous computational elements for first plurality of functional modes in response to a first plurality of configuration information;
a second computational unit having a second plurality of heterogeneous computational elements forming a second reconfigurable architecture, the second reconfigurable architecture being different than the first reconfigurable architecture, a third computational element of the second plurality of heterogeneous computational elements having a third fixed architecture and a fourth computational element of the second plurality of heterogeneous computational elements having a fourth fixed architecture, the third fixed architecture being different than the fourth fixed architecture;
a second interconnection network coupled to the second plurality of heterogeneous computational elements, the second interconnection network capable of configuring the second plurality of heterogeneous computational elements for a second plurality of functional modes in response to a second plurality of configuration information, the second plurality of functional modes being different than the first plurality of functional modes;
a third interconnection network coupled to the first computational unit and to the second computational unit, the third interconnection network capable of selectively and reconfigurably routing data and control information to the first computational unit and to the second computational unit.

78. The adaptive computing integrated circuit of claim 77, wherein the data and control information are collectively embodied as a unitary data packet having a predetermined data structure.

79. The adaptive computing integrated circuit of claim 77, wherein the third interconnection network is further capable of configuring and reconfiguring the first computational unit and the second computational unit for a plurality of operational modes in response to a third plurality of configuration information.

80. The adaptive computing integrated circuit of claim 77, wherein the first and second pluralities of heterogeneous computational elements are selected from a plurality of fixed architectures having at least two of the following corresponding functions: memory, addition, multiplication, complex multiplication, subtraction, configuration, reconfiguration, control, input, output, and field programmability.

81. The adaptive computing integrated circuit of claim 77, further comprising: a controller coupled through the third interconnection network to the first computational unit and to the second computational unit, the controller capable of directing and scheduling the configuration and reconfiguration of the plurality of heterogeneous computational elements for the first and second pluralities of functional modes.

82. An adaptive computing integrated circuit, comprising:
   a first plurality of heterogeneous computational elements forming a first reconfigurable architecture;
   a first interconnection network coupled to the first plurality of heterogeneous computational elements, the first interconnection network capable of configuring and reconfiguring the first plurality of heterogeneous computational elements for a first plurality of functional modes in response to a first plurality of configuration information;
   a second plurality of heterogeneous computational elements forming a second reconfigurable architecture, the second plurality of heterogeneous computational elements being different than the first plurality of heterogeneous computational elements, and the second reconfigurable architecture being different than the first reconfigurable architecture; and
   a second interconnection network coupled to the second plurality of heterogeneous computational elements, the second interconnection network capable of configuring and reconfiguring the second plurality of heterogeneous computational elements for a second plurality of functional modes in response to a second plurality of configuration information, the second plurality of functional modes being different than the first plurality of functional modes.

83. The adaptive computing integrated circuit of claim 82, further comprising:
   a third interconnection network coupled to the first plurality of heterogeneous computational elements and to the second plurality of heterogeneous computational elements, the third interconnection network capable of configuring and reconfiguring the first and second pluralities of heterogeneous computational elements for a plurality of operational modes in response to a third plurality of configuration information.

84. The adaptive computing integrated circuit of claim 83, wherein the third interconnection network is capable of selectively routing control information n to the first plurality of heterogeneous computational elements and to the second plurality of heterogeneous computational elements to direct and control the configuration and reconfiguration of the first plurality of heterogeneous computational elements and the second plurality of heterogeneous computational elements.

85. The adaptive computing integrated circuit of claim 83, wherein the third interconnection network is capable of selectively routing data to the first plurality of heterogeneous computational elements and to the second plurality of heterogeneous computational elements.

86. The adaptive computing integrated circuit of claim 83, further comprising; a controller coupled through the third interconnection network to the first plurality of heterogeneous computational elements and to the second plurality of heterogeneous computational elements, the controller capable of directing and scheduling configuration and reconfiguration of the first and second pluralities of heterogeneous computational elements for the plurality of operational modes.

87. The adaptive computing integrated circuit of claim 83, wherein the first and second pluralities of heterogeneous computational elements are selected from a plurality of fixed architectures having at least two of the following corresponding functions: memory, addition, multiplication, complex multiplication, subtraction, configuration, reconfiguration, control, input, output, and field programmability.

88. The adaptive computing integrated circuit of claim 83, wherein the plurality of operational modes comprises at least two of the following operational modes: linear algorithmic operations, non-linear algorithmic operations, finite state machine operations, memory operations, and bit-level manipulations.

89. An adaptive computing integrated circuit, comprising:
   a plurality of heterogeneous reconfigurable matrices, at least two heterogeneous reconfigurable matrices of the plurality of heterogeneous reconfigurable matrices comprised of distinct and different sets of a plurality of heterogeneous computational elements to form correspondingly distinct and different matrix architectures, each set of the plurality of heterogeneous computational elements coupled to a corresponding first interconnection network and configurable in response to first configuration information for a corresponding plurality of functional mode for performance of a corresponding and distinct algorithm by each of the at least two heterogeneous reconfigurable matrices; and
   a matrix interconnection network coupled to the plurality of heterogeneous reconfigurable matrices, the matrix interconnection network capable of selectively and reconfigurably routing data and control to each heterogeneous reconfigurable matrix of the plurality of reconfigurable matrices, the matrix interconnection network further capable of configuring and reconfiguring the plurality of heterogeneous reconfigurable matrices, in response to second configuration information, for a plurality of operating modes.

90. The adaptive computing integrated circuit of claim 89, further comprising: a controller coupled to the plurality of heterogeneous reconfigurable matrices, the controller capable of providing the first and second configuration information to the heterogeneous reconfigurable matrices and to the matrix interconnection network.

91. The adaptive computing integrated circuit of claim 90, wherein the controller is further capable of providing a unitary data and control packet to the matrix interconnection network for selective routing to the plurality of heterogeneous reconfigurable matrices, the unitary data and control packet having a predetermined data structure containing data and control information.

92. The adaptive computing integrated circuit of claim 89, wherein the plurality of heterogeneous computational elements are selected from a plurality of fixed architectures, the plurality of fixed architectures comprising fixed circuitry having at least two of the following corresponding functions: memory, addition, multiplication, complex multiplication, subtraction, configuration, reconfiguration, control, input, output, and field programmability.

93. The adaptive computing integrated circuit of claim 89, wherein the plurality of operating modes comprises at least two of the following operating modes: linear algorithmic operations, non-linear algorithmic operations, finite state machine operations, memory operations, and bit-level manipulations.

* * * * *